US012773988B2

(12) United States Patent
Nishiura et al.

(10) Patent No.: US 12,773,988 B2
(45) Date of Patent: Oct. 27, 2026

(54) VEHICLE CONTROL DEVICE

(71) Applicant: HITACHI ASTEMO, LTD., Hitachinaka (JP)

(72) Inventors: Chikara Nishiura, Tokyo (JP); Satoshi Kashiwamura, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 18/880,773

(22) PCT Filed: Mar. 2, 2023

(86) PCT No.: PCT/JP2023/007804
§ 371 (c)(1),
(2) Date: Jan. 2, 2025

(87) PCT Pub. No.: WO2024/009557
PCT Pub. Date: Jan. 11, 2024

(65) Prior Publication Data

US 2026/0001535 A1 Jan. 1, 2026

(30) Foreign Application Priority Data

Jul. 7, 2022 (JP) ................................ 2022-109397

(51) Int. Cl.
*B60W 30/095* (2012.01)
*B60W 40/04* (2006.01)

(52) U.S. Cl.
CPC .... *B60W 30/0956* (2013.01); *B60W 30/0953* (2013.01); *B60W 40/04* (2013.01);
(Continued)

(58) Field of Classification Search
CPC ............ B60W 30/09; B60W 30/0953; B60W 30/0956; B60W 40/04; B60W 40/10;
(Continued)

(56) References Cited

U.S. PATENT DOCUMENTS 12,509,070 B2 * 12/2025 Kim .................. B60W 30/0956
2018/0182247 A1 * 6/2018 Baba ...................... G08G 1/166
(Continued)

FOREIGN PATENT DOCUMENTS

JP 2015032028 A 2/2015
JP 2017077829 A 4/2017
JP 2019202586 A * 11/2019 .......... B60R 21/013

*Primary Examiner* — Logan M Kraft
(74) *Attorney, Agent, or Firm* — Volpe Koenig

(57) ABSTRACT

Provided is a vehicle control device capable of preventing unnecessary operations in a driving assistance function for avoiding a collision between an own vehicle and a pedestrian at an intersection, for example. There is provided an operation-suppression determination unit adapted to determine whether to change the result of collision determination (whether to suppress an unnecessary operation), based on the change (temporal change) of the lap rate between a target object and an own vehicle, and based on the change (temporal change) of the lateral speed generated in the target object with respect to the own vehicle, if a collision determination unit determines a collision. Further, there is provided a control-intervention determination unit adapted to determine control intervention in the own vehicle, based on results from the collision determination unit and the operation-suppression determination unit.

14 Claims, 22 Drawing Sheets

(52) U.S. Cl.
CPC ... *B60W 2520/06* (2013.01); *B60W 2520/125* (2013.01); *B60W 2554/4029* (2020.02); *B60W 2554/803* (2020.02)

(58) Field of Classification Search
CPC ......... B60W 2520/06; B60W 2520/12; B60W 2520/125; B60W 2554/4029; B60W 2554/803; B60R 2021/0132; B60R 2021/01322
See application file for complete search history.

(56) References Cited

U.S. PATENT DOCUMENTS

| | | | | |
|---|---|---|---|---|
| 2019/0232956 | A1* | 8/2019 | Takaki | G01S 13/931 |
| 2022/0388502 | A1 | 12/2022 | Lee et al. | |
| 2026/0034982 | A1* | 2/2026 | Akimoto | B60W 30/09 |

* cited by examiner

TRAVELLING-PATH ERROR DISTRIBUTION···DISTRIBUTION OF VARIATION OF FUTURE OWN-VEHICLE TRAVELLING PATH DUE TO DRIVER'S MANIPULATION
PEDESTRIAN ERROR DISTRIBUTION···DISTRIBUTION OF VARIATION OF TARGET OBJECT SPEED DUE TO SENSOR ERROR

VEHICLE CONTROL DEVICE

TECHNICAL FIELD

The present invention relates to vehicle control devices for assisting avoidance of collisions, for example, between a vehicle and a pedestrian at an intersection.

BACKGROUND ART

As a conventional technique for assisting avoidance of collisions at intersections, Patent Literature 1 suggests a driving assistance device that performs collision determination in consideration of turning of an own vehicle, with respect to a pedestrian traversing an intersection. Further, in addition to the aforementioned technique, Patent Literature 1 suggests a method for permitting operations for limited such as crosswalks, through an external environment recognition device such as map information, in order to cause the aforementioned driving assistance device to operate at appropriate locations (collisions on crosswalks and the like) in driving assistance for avoiding collisions at intersections.

CITATION LIST

Patent Literature

PTL 1: JP 2015-32028 A

SUMMARY OF INVENTION

Technical Problem

However, in collision determination accompanied by turning of the own vehicle as in the aforementioned Patent Literature 1, it may be determined that the own vehicle will collide with a target object which will not necessarily collide therewith at an intersection or the like, thereby inducing an erroneous operation (unnecessary operation), for the following reasons (see FIG. 13).

(1) An intersection AEB (collision damage reduction brake) performs collision determination, based on a traveling path of the own vehicle during turning, and a traveling path of a target object. Such an intersection AEB tends to cause unnecessary operations with respect to translational pedestrians and the like, due to errors of estimation of the own-vehicle traveling path.

(2) In order to avoid erroneous operations, it is common to use a method for preventing unnecessary operations using information for separating vehicles and pedestrians from each other, such as information about sidewalks and crosswalks.

(3) In Japan and overseas, there are many intersections equipped with no sidewalk or no crosswalk, and in such intersections, it is impossible to prevent unnecessary operations by the conventional method.

In order to facilitate appropriate operations of a driving assistance function for avoiding a collision between an own vehicle and a pedestrian at an intersection, the aforementioned Patent Literature 1 suggests a method for limiting an operation area to crosswalks or the like. However, as described in the aforementioned (3), among roads in Japan and overseas, there are many roads which are not equipped with physical environments for separating pedestrians and vehicles from each other, such as crosswalks and sidewalks.

On such roads, it may be impossible to prevent operations with respect to subjects which will not actually collide with vehicles.

FIG. 14 illustrates scenes where an unnecessary operation is caused by a driving assistance function for avoiding a collision at an intersection. As one of unnecessary operations, there is a scene where a pedestrian is translationally travelling, in a state where an own vehicle is travelling through an intersection while the driver is increasing the steering. Assuming a traveling path error distribution as a distribution of variations of a future traveling path of the own vehicle due to driver's manipulations, and a pedestrian error distribution as a variation of the speed of the pedestrian due to sensor errors and the like, when the pedestrian is a translational pedestrian, there is a smaller portion where the traveling path error distribution and the pedestrian error distribution overlap with each other, namely, there is a smaller portion where a collision may occur. This reveals that unnecessary operations are likely to occur if a collision is determined, in this state. However, in a scene where the pedestrian is orthogonally traveling (traversing) when the driver is increasing the steering, the traveling path error distribution and the pedestrian error distribution substantially overlap each other. This reveals that there is a higher possibility of collision (a state where unnecessary operations are less likely to occur if a collision is determined). Further, in a scene where the own vehicle is passing through an intersection while the driver is decreasing the steering at the exit of the intersection or the like, in a case where the pedestrian is an orthogonally travelling pedestrian, there is a smaller portion where the traveling path error distribution and the pedestrian error distribution overlap each other, thereby causing a state where unnecessary operations are likely to occur if a collision is determined.

It is an object of the present invention to provide a vehicle control device capable of detecting scenes as described above and preventing unnecessary operations in a driving assistance function for avoiding a collision, for example, between an own vehicle and a pedestrian at an intersection.

Solution to Problem

A representative example of the invention disclosed in the present application is as follows. That is, there is provided a vehicle control device for controlling a vehicle. The vehicle control device includes: an external-field recognition unit adapted to recognize information about a field outside an own vehicle; a vehicle-information acquisition unit adapted to acquire a state of the own vehicle; a collision determination unit adapted to determine a collision between a target object and the own vehicle, based on information about the target object around the own vehicle acquired by the external-field recognition unit, and based on the state of the own vehicle acquired by the vehicle-information acquisition unit; an operation-suppression determination unit adapted to determine whether to change a result of the collision determination, based on a change of a lap rate between the target object and the own vehicle, and based on a change of a lateral speed generated in the target object with respect to the own vehicle, when the collision determination unit determines a collision; and a control-intervention determination unit adapted to determine control intervention in the own vehicle, from results from the collision determination unit and the operation-suppression determination unit.

Advantageous Effects of Invention

According to the present invention, for example, it is possible to provide a vehicle control device capable of assisting appropriate avoidance of a collision between a vehicle and a pedestrian, at an intersection that is not equipped with an environment for separating vehicles and pedestrians from each other, such as a sidewalk or a crosswalk.

Other problems, structures, and advantages than those described above will be clarified by the following description of embodiments.

DESCRIPTION OF EMBODIMENTS

Figure 1:
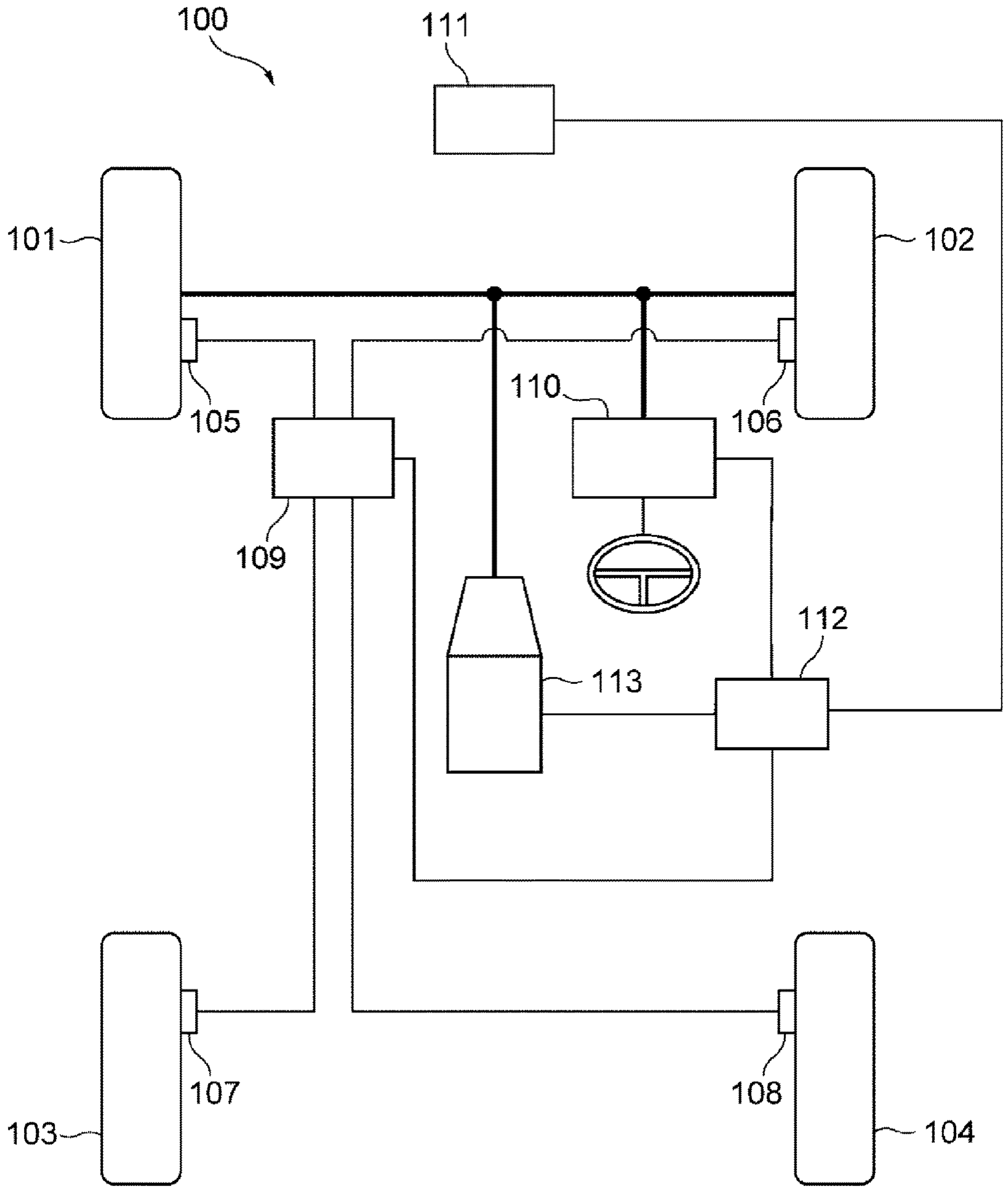
FIG. 1 is a schematic structure view of a vehicle equipped with a driving assistance system in a first example.

Hereinafter, examples of the present invention will be described with reference to the drawings. However, the present invention should not be construed as being limited to the contents described in the following examples. Those skilled in the art can easily understand that the specific structure of the present invention can be changed without departing from the spirit or gist of the present invention. In the structures of the invention which will be described hereinafter, the same or similar structures or functions are denoted by the same reference numerals and will not be described redundantly.

First Example

FIG. 1 is a schematic structure view of a vehicle equipped with a driving assistance system in a first example of the present invention. The vehicle (own vehicle) 100 is a four-wheel vehicle, and a reference numeral 101 denotes a left front wheel, a reference numeral 102 denotes a right front wheel, a reference numeral 103 denotes a left rear wheel, and a reference numeral 104 denotes a right rear wheel. A reference numeral 105 denotes a wheel cylinder provided on the left front wheel 101, a reference numeral 106 denotes a wheel cylinder provided on the right front wheel 102, a reference numeral 107 denotes a wheel cylinder provided on the left rear wheel 103, and a reference numeral 108 denotes a wheel cylinder provided on the right rear wheel 104.

A reference numeral 109 denotes a wheel-cylinder hydraulic control device capable of adjusting the hydraulic pressure in each of the wheel cylinders 105, 106, 107, and 108, which is typified by a sideslip device. A reference numeral 110 denotes a steering device capable of automatic steering, which includes a steering angle sensor for detecting the steering angle of steering and includes an actuator regarding steering, which is typified by an electric power steering device.

A reference numeral 111 denotes an external-field recognition sensor (external-field recognition unit) constituted by a camera, a radar, or the like, for detecting (recognizing) a target object such as a pedestrian existing in a field outside (surrounding) the vehicle 100. A reference numeral 112 denotes an external-field recognition controller for calculating the position and the speed of the target object detected (recognized) by the external-field recognition sensor 111. The external-field recognition controller 112 also includes a vehicle control controller 200 (FIG. 2) capable of determining a collision between the own vehicle 100 and the target object from information about the position and the speed of the target object and from vehicle information about the own vehicle 100, and determining a manipulation of a braking device.

A reference numeral 113 denotes an engine. As a prime mover (driving power source) of the vehicle 100, it is also possible to use either a motor, instead of the engine 113, or the engine 113 and a motor in combination.

Figure 2:
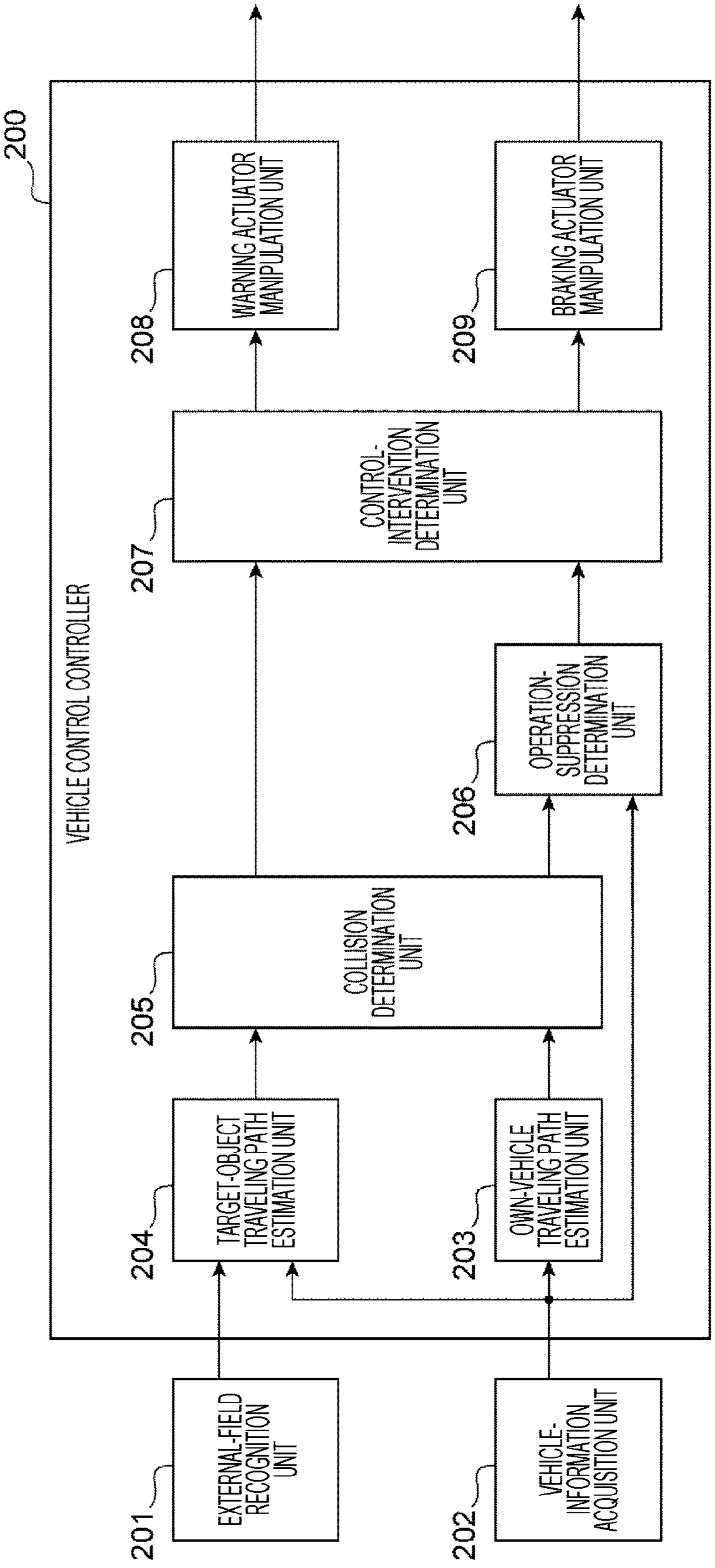
FIG. 2 is a functional block diagram of a vehicle control controller (vehicle control device) in the first example.

FIG. 2 is a functional block diagram of the vehicle control controller (vehicle control device) in the first example of the present invention. The vehicle control controller (vehicle control device) 200 is an electronic control device constituted mainly by a microcomputer including a processor, a memory, an I/O, and a bus connecting them to each other; and performs arithmetic operations based on various pieces of input information and outputs results of arithmetic operations.

An external-field recognition unit 201 is constituted by a camera, a radar, or the like installed in the vehicle (own vehicle) 100; and acquires information (target object information) about a target object existing in a field outside (in front of) the own vehicle 100, and transmits the information to the vehicle control controller 200.

A vehicle-information acquisition unit 202 is constituted by a wheel speed sensor, a steering angle sensor, a yaw rate sensor, and the like disposed in the vehicle (own vehicle) 100; and acquires information (vehicle information) about conditions of the own vehicle 100 such as the speed, the steering angle, and the yaw rate of the own vehicle, and transmits the information to the vehicle control controller 200.

The vehicle control controller 200 mainly includes, as functional blocks, an own-vehicle traveling path estimation unit 203, a target-object traveling path estimation unit 204, a collision determination unit 205, an operation-suppression determination unit 206, a control-intervention determination unit 207, a warning actuator manipulation unit 208, and a braking actuator manipulation unit 209.

The own-vehicle traveling path estimation unit 203 estimates a future traveling path of the own vehicle, from the speed, the steering angle, and the yaw rate of the own vehicle, which have been obtained from the vehicle-information acquisition unit 202, when the own vehicle is travelling through an intersection.

The target-object traveling path estimation unit 204 calculates the position and the speed of the target object, from the target object information obtained from the external-field recognition unit 201, and estimates a future traveling path of the target object.

The collision determination unit 205 determines a collision between the target object and the own vehicle, by calculating a degree of overlap (overlap rate) between the own vehicle and the target object, a time period until a collision (TTC), and the like, based on the result of the estimation of a future traveling path of the target object by the target-object traveling path estimation unit 204, and based on the result of the estimation of a future traveling path of the own vehicle by the own-vehicle traveling path estimation unit 203.

If the collision determination unit 205 determines a collision, the operation-suppression determination unit 206 determines whether or not control is necessary for the collision (whether operation suppression is unnecessary or necessary). In other words, the operation-suppression determination unit 206 determines whether to change the result of the collision determination, thereby suppressing an operation (unnecessary operation). If operation suppression is necessary, the operation-suppression determination unit 206 transmits the determination of operation suppression and an operation suppression gain to the control-intervention determination unit 207.

The control-intervention determination unit 207 determines the presence or absence of control intervention, based on the overlap rate (which may be simply referred to as a lap rate, hereinafter) and the TTC calculated by the collision determination unit 205, and based on the determination of operation suppression and the operation suppression gain transmitted from the operation-suppression determination unit 206. If control intervention is determined, the control-intervention determination unit 207 transmits warning and braking commands to the respective actuator manipulation units (208, 209).

The warning actuator manipulation unit 208 is constituted by a buzzer or a single buzzer mounted in a combination meter. If the control-intervention determination unit 207 determines that control intervention by warning is necessary, the warning actuator manipulation unit 208 sounds the warning buzzer, in response to the warning buzzer manipulation request transmitted from the control-intervention determination unit 207.

The braking actuator manipulation unit 209 is mounted in a brake actuator such as a side-slip prevention device. If the control-intervention determination unit 207 determines that control intervention through braking is necessary, since the risk of the collision is not avoided even by the control intervention through warning, the braking actuator manipulation unit 209 applies a braking force to the vehicle 100 according to the collision avoidance brake operation request and a required speed reduction transmitted from the control-intervention determination unit 207.

Figure 3:
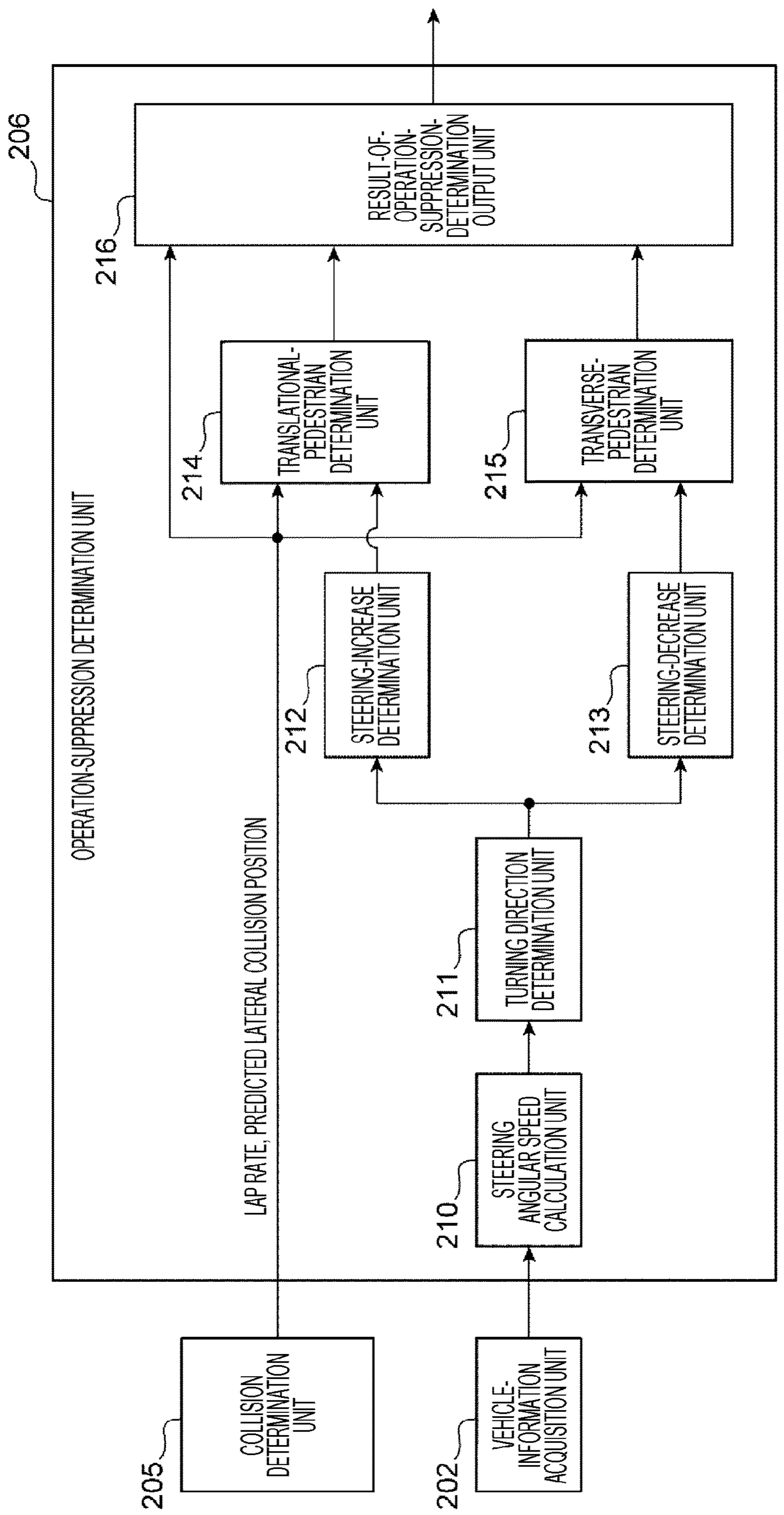
FIG. 3 is a functional block diagram of an operation-suppression determination unit in the first example.

FIG. 3 is a functional block diagram of the operation-suppression determination unit 206 in the first example of the present invention. The operation-suppression determination unit 206 in the present first example includes a steering angular speed calculation unit 210, a turning direction determination unit 211, a steering-increase determination unit 212, a steering-decrease determination unit 213, a translational-pedestrian determination unit 214, a transverse-pedestrian determination unit 215, and a result-of-operation-suppression-determination output unit 216.

The steering angular speed calculation unit 210 calculates a steering angular speed (right steering speed or left steering speed) from the steering angle obtained from the vehicle-information acquisition unit 202.

The turning direction determination unit 211 determines the turning direction (rightward turning or leftward turning) from the steering angle and yaw rate information obtained from the vehicle-information acquisition unit 202.

The steering-increase determination unit 212 and the steering-decrease determination unit 213 determines steering-increase or steering-decrease according to the turning direction, based on the result of the steering angular speed calculation by the steering angular speed calculation unit 210, and based on the result of the turning-direction n determination by the turning direction determination unit 211.

The translational-pedestrian determination unit 214 determines a translational pedestrian for which operation suppression is required, based on the lap rate and the determined collision position (predicted lateral collision position) obtained from the collision determination unit 205, if the steering-increase determination unit 212 determines steering-increase (which will be described in detail later).

The transverse-pedestrian determination unit 215 determines a transverse pedestrian for which operation suppression is required, based on the lap rate and the determined collision position (predicted lateral collision position) obtained from the collision determination unit 205, if the steering-decrease determination unit 213 determines steering-decrease (which will be described in detail later).

The result-of-operation-suppression-determination output unit 216 sets a control threshold value adjustment gain (which may be simply referred to as an adjustment gain, hereinafter), according to the translational pedestrian determination by the translational-pedestrian determination unit 214 during steering-increase, the transverse pedestrian determination by the transverse-pedestrian determination unit 215 during steering-decrease, and the lap rate and the determined collision position (predicted lateral collision position) obtained from the collision determination unit 205. Further, the result-of-operation-suppression-determination output unit 216 transmits the result of them to the control-intervention determination unit 207 (FIG. 2).

Figure 4:
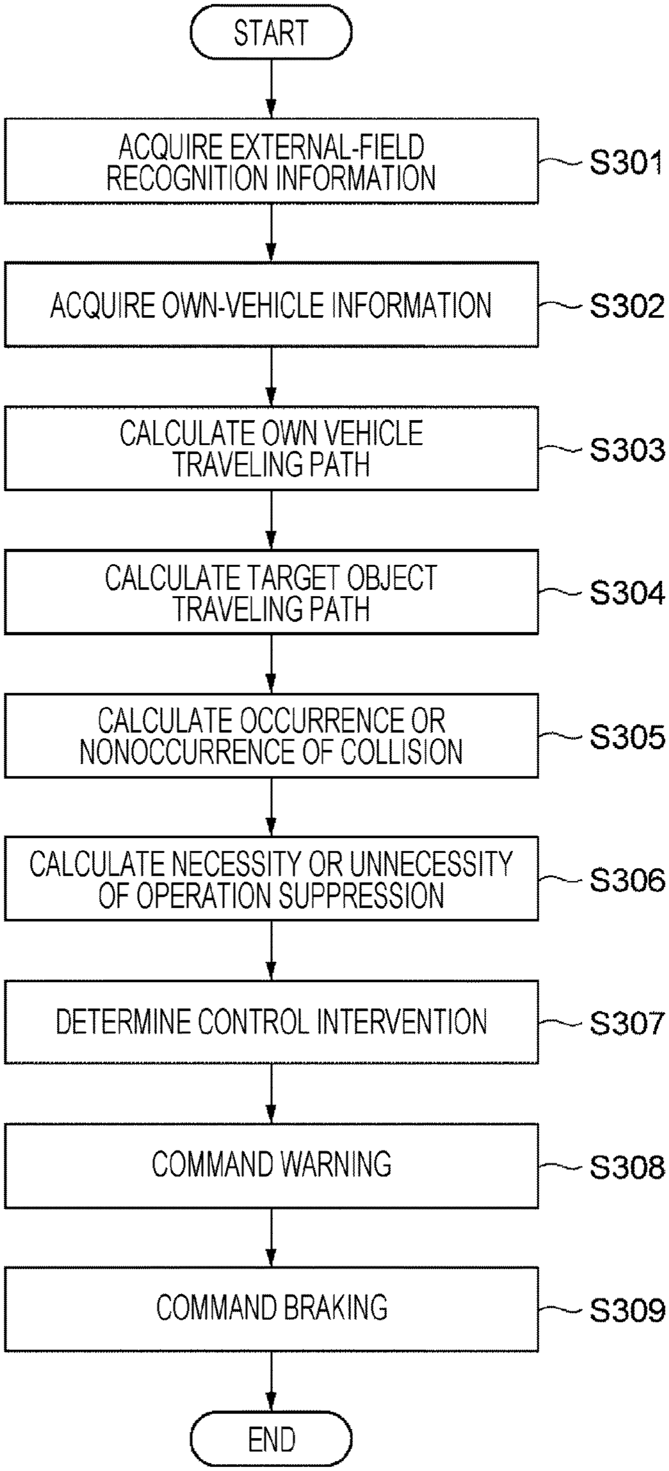
FIG. 4 is a flowchart in the vehicle control controller in the first example.

FIG. 4 is a flowchart in the vehicle control controller 200 in the first example of the present invention.

First, information about the position and the speed of a pedestrian is acquired as external-field recognition information (target object information) from the external-field recognition unit 201 (step S301).

Further, information about the vehicle body speed, the vehicle yaw rate, and the steering angle is acquired as own-vehicle information (vehicle information) from the vehicle-information acquisition unit 202 constituted by a wheel speed sensor, a yaw rate sensor, a steering angle sensor and the like, which are provided in the vehicle 100 (step S302).

When the own vehicle is entering an intersection, the own-vehicle traveling path estimation unit 203 estimates the traveling path of the own vehicle, from the own-vehicle speed, the yaw rate, and the steering angle (step S303). The own-vehicle traveling path refers to a trajectory through which the own vehicle is passing, and is expressed by a set of a position and a direction of the own vehicle. Predicting the traveling path corresponds to predicting future own-vehicle position and direction. However, it is impossible to perform accurate prediction of them, including prediction of the driver's intention. Therefore, in the present example, the traveling path is predicted under the precondition that the own vehicle travels while maintaining the current steering angle and the current speed (namely, performing a steady circular turn). Assuming that the own vehicle behavior is steady circle turning, it is possible to determine the traveling path of the own vehicle, by grasping the speed and the yaw rate of the own vehicle. It is possible to obtain a relatively stable and accurate value of the own-vehicle speed, from the wheel speed sensor. The yaw rate may be obtained from a yaw rate sensor, or a steering-angle converted yaw rate may be used, where the steering-angle converted yaw rate is resulted from conversion of the steering angle into a yaw rate that can be generated by the vehicle. The yaw rate $Y_{SAO}$ [rad/s] calculated by the own-vehicle traveling path estimation unit 203 is referred to as an own-vehicle traveling path yaw rate.

The target-object traveling path estimation unit 204 estimates the traveling path of the target object from external-field recognition information (target object information) (step S304). In the present example, a future motion of the target object is assumed to be a uniform linear motion at the current ground speed from the current position. In order to calculate a future position of the target object, it is necessary to grasp information about the current motion (the position and the ground speed) of the target object. As the current position of the target object, a current target object position ($xR_{p\_cur}$, $yR_{p\_cur}$) [m] obtained by the external-field recognition unit 201 is used. Next, as information ($VxR_{p\_cur}$, $VyR_{p\_cur}$) [m/s] about the current speed of the target object, speed information transmitted from the external-field recognition unit 201 constituted by a camera and the like is used.

Figure 5:
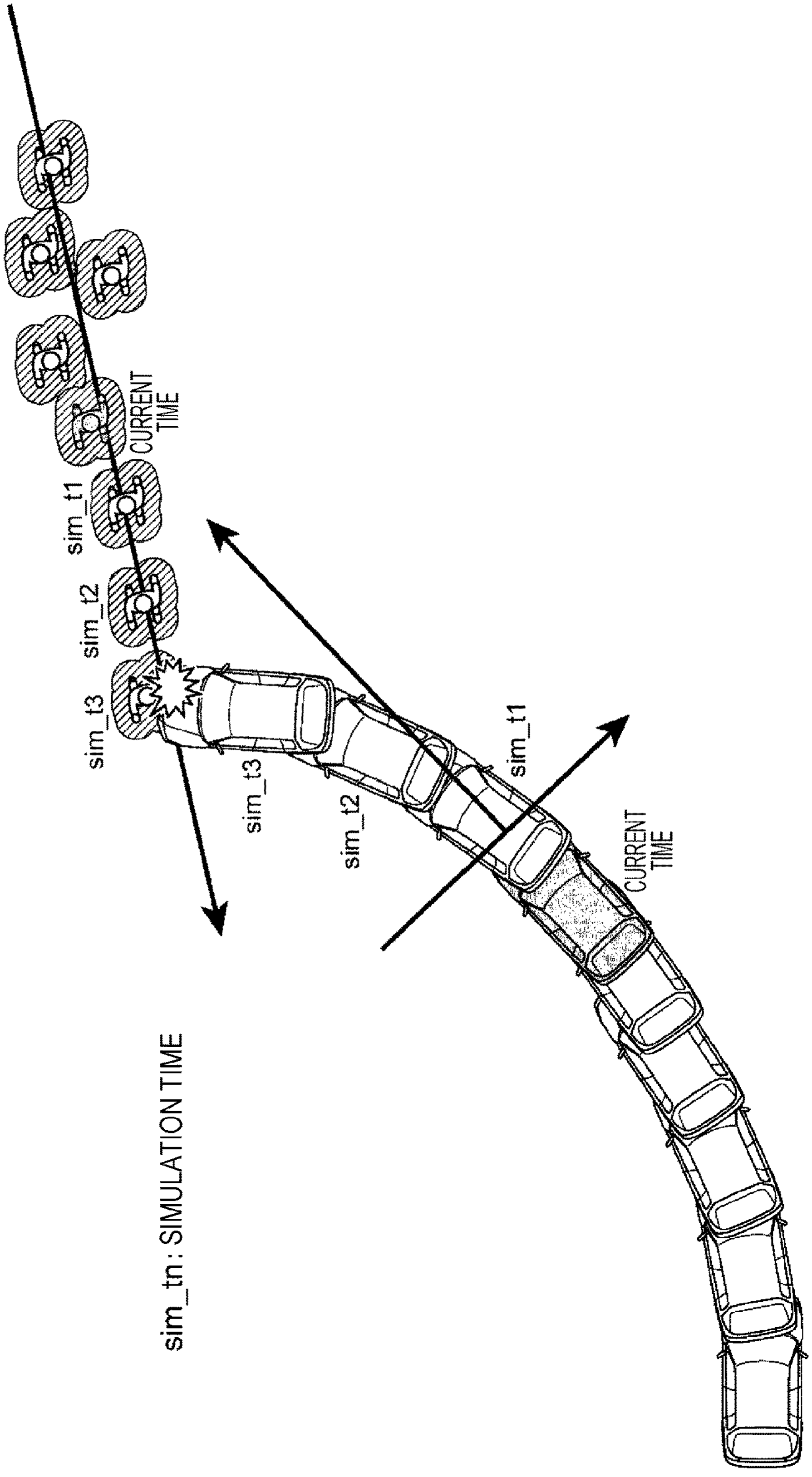
FIG. 5 is a view for explaining a collision simulation.

The collision determination unit 205 determines whether the own vehicle and the target object will collide with each other in the future, based on the estimated future traveling path of the own vehicle and the future traveling path of the target object (step S305). In the present example, in order to predict the state of the future collision (collision determination, time until the collision, and the like) between the own vehicle and the target object, a collision simulation is performed, wherein the collision simulation calculates a collision state at each future time, from a positional relationship between the own vehicle and the target object, assuming that a future motion of the own vehicle is steady circle turning, and a future motion of the target object is a uniform linear movement. The collision simulation is a loop arithmetic operation for predicting a future collision between the own vehicle and the target object (FIG. 5). Assuming that a future motion of the own vehicle is steady circle turning, and a future motion of the target object is a uniform linear movement, by grasping the positional relationship between the own vehicle and the target object at each simulation time, calculations are performed for the collision determination, the overlap rate, the relative speed at the time of collision, and the time to collision (TTC) for each target object. Based on the future positional relationship between the own vehicle and the target object, it is determined whether there is a possibility of collision, in the future until a predetermined time period ahead, at which the simulation time period is maximized. If a collision is predicted, it is determined that "there will be a collision", and otherwise, it is determined that "there will be no collision".

<Implementation of the Collision Simulation>

In the collision simulation, collision determination is performed based on the positional relationship between the own vehicle and the target object at each simulation time, inspection is performed on the result of the collision determination until the maximum simulation time, and a final result of collision determination is calculated. Steps1~3 which will be described later are repeated at each simulation time $t_f$, from $t_f$=a minimum value to $t_f$=a maximum value.

<<Step 1: Calculate a Future Position of the Own Vehicle>>

(Calculate the Yaw Angle of the Own Vehicle)

First, the yaw angle $\theta(t_f)$ [rad] of the center of gravity of the own vehicle (assuming that the current traveling direction of the own vehicle is at 0 degree) is calculated from the yaw rate $Y_{SAO}$ [rad/s] of the traveling path of the own vehicle at the current time point. Incidentally, there are provided upper and lower limit values of +90 degrees, on the yaw angle of the center of gravity of the own vehicle, since it is assumed that the own vehicle is travelling at an intersection.

(Calculate a Future Position of the Center of Gravity of the Own Vehicle)

Next, a future position of the center of gravity of the own vehicle ($xsR_v(t_f)$, $ysR_v(t_f)$) [m] is calculated, based on the yaw angle $\theta(t_f)$ [rad] of the center of gravity of the own vehicle, and the current speed $V_0$ [m/s] of the own vehicle. Incidentally, when $\theta(t)$ exceeds the range of ±N/2, this indicates straight traveling.

<<Step 2: Calculate a Future Position of the Target Object>>

(Calculate a Future Position of the Target Object (with Respect to the Current Coordinates of the Vehicle))

First, a future position ($xsR_p(t_f)$, $ysR_p(t_f)$) [m] of the target object with respect to the current coordinates of the vehicle is calculated, from the current ground speed ($VxR_{p\_cur}$, $VyR_{p\_cur}$) [m/s] of the target object, and the coordinates ($xR_{p\_cur}$, $yR_{p\_cur}$) [m] of the target object.

<<Step 3: Determine Occurrence or Nonoccurrence of Future Collision>>

Figure 6:
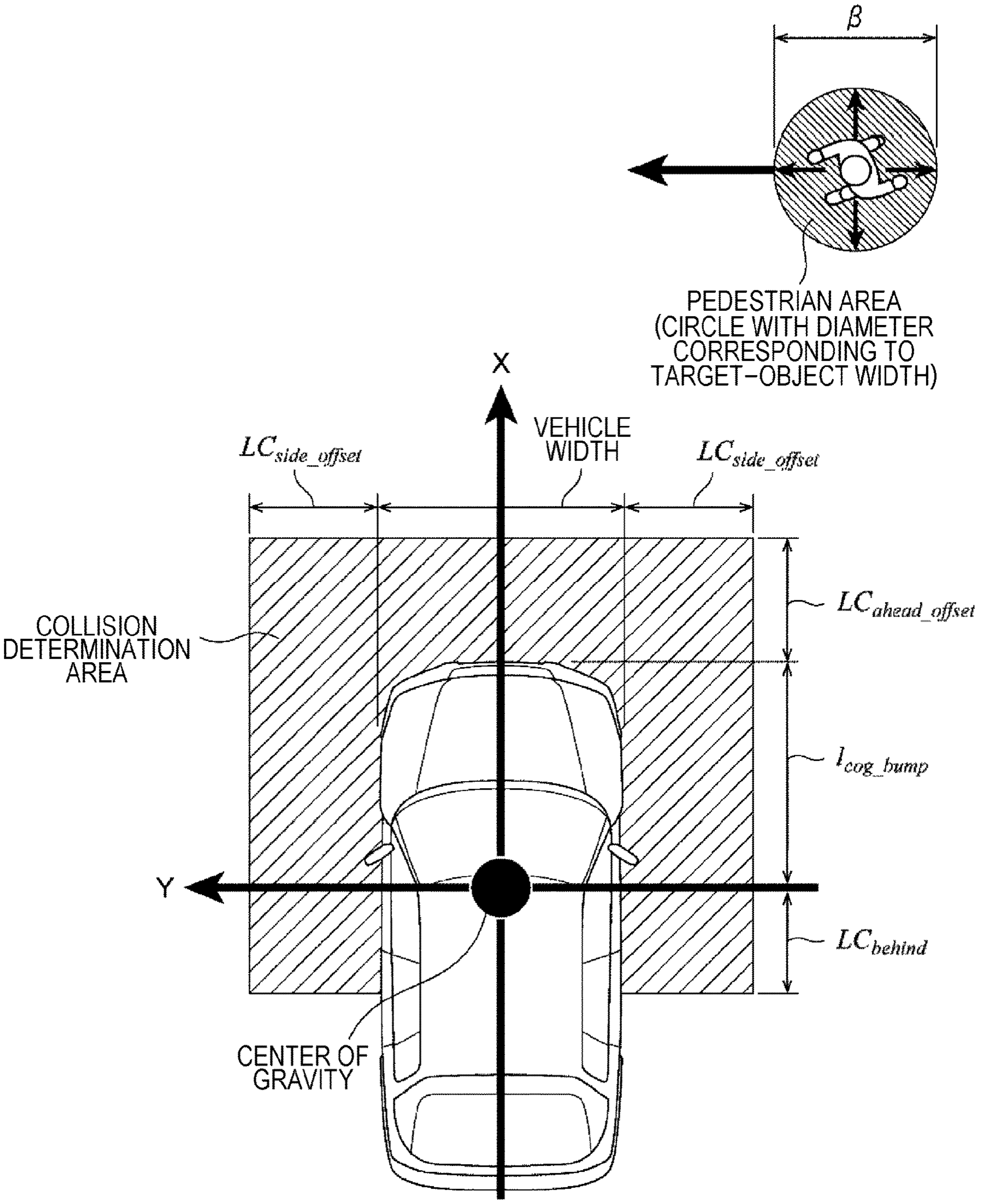
FIG. 6 is a view for explaining a collision determination area and a pedestrian area.

Based on the position ($xsR_p(t_f)$, $ysR_p(t_f)$) [m] of the target object calculated in the step2, if the positional relationship between the vehicle and the target object is such that they overlap each other, it is determined that "there will be a collision" and otherwise, it is determined that "there will be no collision". Incidentally, for the target object, there is provided a pedestrian area having a diameter corresponding to the target-object width and centered on the target object position. Further, for the own vehicle, there is provided a collision determination area provided with margins in the forward, rearward, leftward and rightward directions from the center of gravity of the own vehicle (see FIG. 6). This enables easily tuning the influence of the sensor variation and the sensitivity of the collision determination.

<<Step 3-1: Determination of Overlap in the Forward and Rearward Directions>>

When the following determination formula holds, it is determined that "there is an overlap". Otherwise, it is determined that "there is no overlap".

[Formula 1]

$$\left(xsR_p(t_f) - \frac{\beta}{2} < l_{cog_{bump}} + LC_{ahead\_offset}\right) \text{ and } \left(xsR_p(t_f) - \frac{\beta}{2} > -LC_{behind}\right)$$

$t_f$: Simulation time [s] (assuming that current time is 0)
β: Target object longitudinal and lateral widths [m]
$LC_{ahead\_offset}$·$LC_{behind}$: Collision determination area forward offset distance·rearward distance [m]

<<Step 3-2: Determination of Overlap in the Leftward and Rightward Directions>>

When the following determination formula holds, it is determined that "there is an overlap". Otherwise, it is determined that "there is no overlap".

[Formula 2]

$$\left(ysR_p(t_f) - \frac{\beta}{2} < \left(\frac{VD}{2} + LC_{side\_offset}\right)\right) \text{ and } \left(ysR_p(t_f) - \frac{\beta}{2} > -\left(\frac{VD}{2} + LC_{side\_offset}\right)\right)$$

$t_f$: Simulation time [s] (assuming that current time is 0)
β: Target object longitudinal and lateral widths [m]
$LC_{side_{offset}}$: Collision determination area side offset distance [m]
VD: Own vehicle lateral width [m]

<Calculation of the Overlap Rate>

Figure 7:
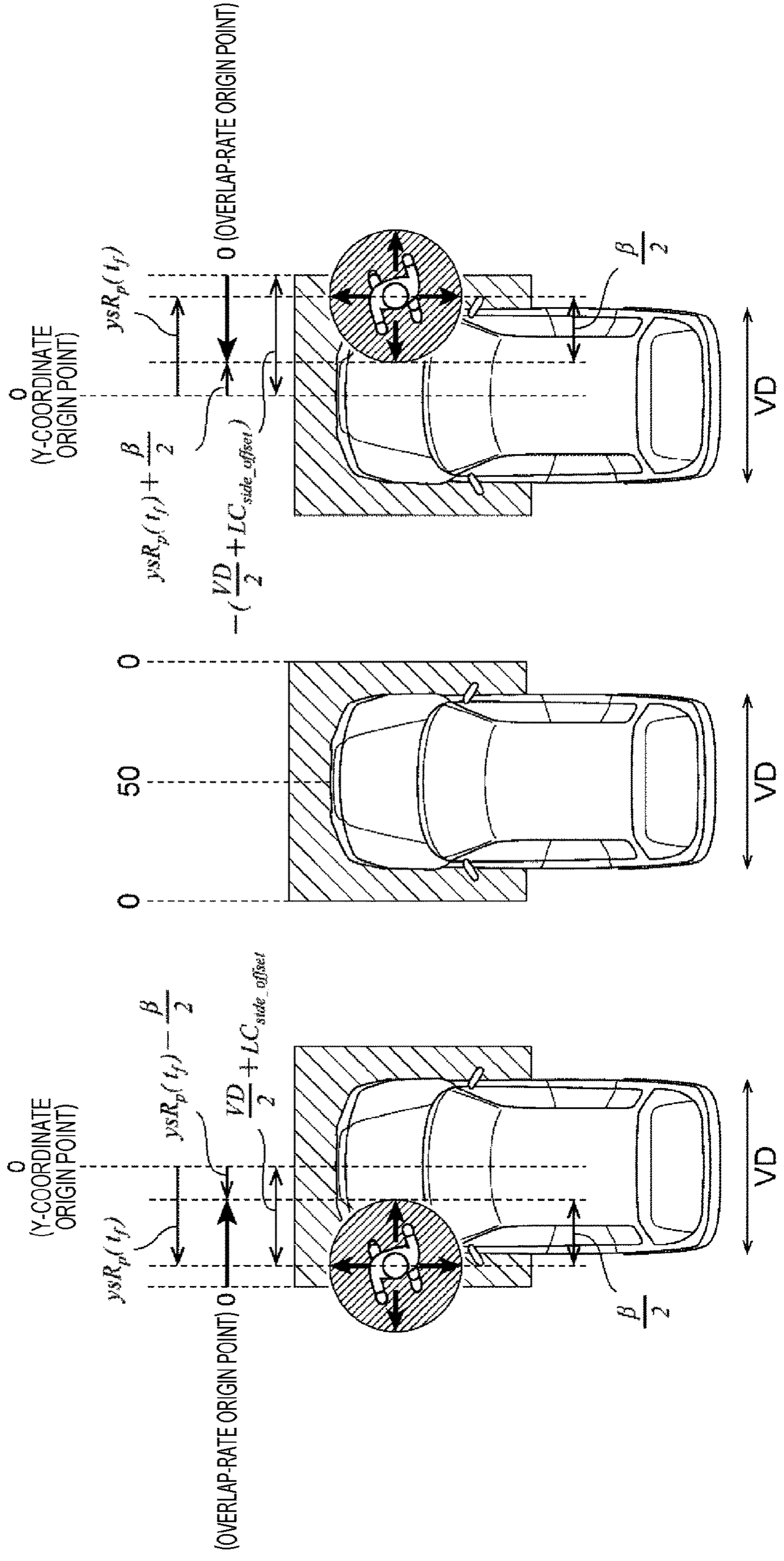
FIG. 7 is a view for explaining an overlap rate.

An overlap rate is calculated based on a future positional relationship between the own vehicle and the target object in the future until a predetermined time period ahead, at which the simulation time is maximized, wherein the overlap rate is a parameter indicating the rate of the overlap between the own vehicle and the target object which are being viewed in the lateral direction. The overlap rate at each simulation time is calculated through a different calculation formula for each of a case where the center of the target object is forward of the center of the own vehicle, and a case where the center of the target object is on the left or right of the center of the own vehicle (see FIG. 7).

<<Method for Calculating the Overlap Rate at Each Time when the Center of the Target Object is in the Left Side of the Own Vehicle ($ysR_p(t_f) \geq 0$)>>

When the center of the target object is in the left side of the own vehicle (the left side in FIG. 7), the overlap rate [%] at each time is calculated based on the position of the target object and respective width values.

[Formula 3]

$$PreOverLap(t_f) = \mathrm{Min}\left(\frac{\left(\frac{VD}{2} + LC_{side\_offset}\right) - \left(ysR_p(t_f) - \frac{\beta}{2}\right)}{VD} \cdot 100,\ 50\right)$$

Collision determination area side offset distance is $LC_{side\_offset}$ [m],
Target object longitudinal and lateral widths is β [m] (0>),
Own vehicle lateral width is VD[m] (0>),
Target object coordinates are ($xsR_p(t_f)$, $ySR_p(t_f)$) [m],
$t_f$: Simulation time <<Method for Calculating the Overlap Rate at Each Time when the Center of the Target Object is in the Right Side of the Own Vehicle ($ysR_p(t_f) < 0$)>>

When the center of the target object is in the right side of the own vehicle (the right side in FIG. 7), the overlap rate [%] at each time is calculated based on the position of the target object and the respective width values.

[Formula 4]

$$PreOverLap(t_f) = \mathrm{Min}\left(-\left(\frac{-\left(\frac{VD}{2} + LC_{side\_offset}\right) - \left(ysR_p(t_f) - \frac{\beta}{2}\right)}{VD}\right) \cdot 100,\ 50\right)$$

Collision determination area side offset distance is $LC_{side\_offset}$ [m],
Target object longitudinal and lateral widths is β [m] (0>),
Own vehicle lateral width is VD[m] (0>),
Target object coordinates are ($xsR_p(t_f)$, $ySR_p(t_f)$) [m],
$t_f$: Simulation time <Calculation of the Relative Speed at the Time of Collision>

Assuming that the overlap rate at each simulation time is largest at a simulation time $t_{fr}$ [s] in the future until a predetermined time period ahead, at which the simulation time is maximized, the relative speed of the target object viewed from the own vehicle at $t_{fr}$ [s] is calculated as the relative speed at the time of collision. The relative speed is calculated based on the positional relationship between the own vehicle and the target object at each simulation time. Further, the relative speeds until the maximum simulation time are inspected, and the relative speed at the time of collision is calculated. In the inspection, the relative speed at the time of collision is set at the relative speed at the simulation time at which the overlap rate at each simulation time is largest.

<<The Relative Speed at $t_{fr}$ [s]>>

Based on the yaw angle $\theta(t_{fr})$ of the center of gravity of the own vehicle, and based on the current ground speed ($VxR_{p\_cur}$, $VyR_{p\_cur}$) of the target object, the relative speeds of the target object in the X direction and the Y direction are calculated through the following formula. At this time, the sideslip angle of the own vehicle is approximated to 0 [rad], so that the speed of the own vehicle in the Y direction (lateral direction) is regarded as 0 [m/s], and the speed of the own vehicle in the X direction (longitudinal direction) is regarded as V0 [m/s] (the current speed of the own vehicle).

[Formula 5]

$$\begin{pmatrix} VsxR_p(t_{fr}) \\ VsyR_p(t_{fr}) \end{pmatrix} = \begin{pmatrix} \cos(-\theta(t_{fr})) & -\sin(-\theta(t_{fr})) \\ \sin(-\theta(t_{fr})) & \cos(-\theta(t_{fr})) \end{pmatrix} \cdot \begin{pmatrix} VxR_{p\_cur} \\ VyR_{p\_cur} \end{pmatrix} - \begin{pmatrix} V_0 \\ 0 \end{pmatrix}$$

($VxR_{p\_cur}$, $VyR_{p\_cur}$) Current moving speeds [m/s] of target object in X axis and Y axis directions
$t_{fr}$: Simulation time at which overlap rate at each simulation time is maximized
$V_0$: Current speed [m/s] of own vehicle <Calculation of Time to Collision (TTC)>

A calculation is performed for a margin time to the collision, in the future until a predetermined time period ahead at which the simulation time is maximized. As the margin time to collision (TTC), the time to the collision is set at the simulation time $t_{fc}$ [s] at which it is determined for the first time that "there will be a collision".

If the collision determination unit 205 determines that the own vehicle and the target object will collide with each other in the future, the operation-suppression determination unit 206 determines whether or not warning or a brake operation is actually necessary for the collision, and whether suppression of warning or a brake operation is necessary (step S306). In other words, the operation-suppression determination unit 206 determines whether it is necessary to change the result of the collision determination by the collision determination unit 205. In the operation-suppression determination unit 206 in the present example, a steering angular speed is calculated from the steering angle information obtained from the vehicle-information acquisition unit 202 (the steering angular speed calculation unit 210), the turning direction is determined from the steering angle and yaw rate information obtained from the vehicle-information acquisition unit 202 (the turning direction determination unit 211), and steering-increase or steering-decrease is determined according to the turning direction (the steering-increase determination unit 212 and steering-decrease determination unit 213). If steering-increase is determined, a translational pedestrian for which operation suppression is necessary is determined, based on the lap rate and the determined collision position (the predicted collision lateral position) obtained from the collision determination unit 205 (the translational-pedestrian determination unit 214). Further, If steering-decrease is determined, a transverse pedestrian for which operation suppression is necessary is determined, based on the lap rate and the determined collision position (the predicted collision lateral position) obtained from the collision determination unit 205 (the transverse-pedestrian determination unit 215). The method for determining operation suppression will be described in detail later. If it is determined that operation suppression is necessary, the operation-suppression determination unit 206 transmits the operation-suppression determination or an operation suppression gain calculated through the operation suppression determination, to the control-intervention determination unit 207 (the result-of-operation-suppression-determination output unit 216).

The control-intervention determination unit 207 makes an operation request for warning/brake control, according to a collision risk calculated from the result of the collision simulation for each target object, which has been calculated by the collision determination unit 205 (step S307). In the present example, control intervention is performed with a warning buzzer and a collision avoidance brake in the mentioned order, as the collision risk increases. The collision risk is evaluated based on the time to collision (TTC) calculated by the collision determination unit 205. Incidentally, in the present example, the control intervention determination is performed using the way distance until the collision (which will be referred to as a TTC-converted way distance, hereinafter), which has been converted from TTC. Further, if the TTC-converted way distance is smaller than an operation distance threshold value for each control, an operation request is issued. The TTC-converted way distance is calculated by "TTC×the own-vehicle speed". When an operation request is issued, an operation request indicating that "there is an operation request" is issued to the warning actuator manipulation unit 208 and the braking actuator manipulation unit 209.

Regarding an operation request to the warning actuator, if the TTC-converted way distance falls below the control intervention threshold value for the warning buzzer, it is determined to make an operation request. If it is determined to operate the warning actuator, the control-intervention determination unit 207 transmits a warning buzzer sound command to the warning actuator manipulation unit 208. Regarding the control intervention threshold value for the warning buzzer, a reference TTC for the warning buzzer is set for each vehicle speed by map drawing, and a reference way distance threshold value is determined by multiplying the own vehicle speed by the reference TTC for each vehicle speed. As the control intervention threshold value for the warning buzzer, the reference way distance threshold value is multiplied by an adjustment gain for the warning buzzer based on the overlap rate, and by the operation suppression gain calculated in the step S306, thereby resulting in a final control intervention threshold value for the warning buzzer.

Regarding an operation request to the braking actuator, if the TTC-converted way distance falls below a control intervention threshold value for the collision avoidance brake, it is determined to make an operation request. If it is determined to operate the braking actuator, the control-intervention determination unit 207 transmits a predetermined requested speed-reduction value, together with a braking execution command, to the braking actuator manipulation unit 209. Regarding the control intervention threshold value for the collision avoidance brake, a reference TTC for the collision avoidance brake is set for each vehicle speed by map drawing, and the reference way distance threshold value is determined by multiplying the own vehicle speed by the reference TTC for each vehicle speed. As the control intervention threshold value for the collision avoidance brake, the reference way distance threshold value is multiplied by an adjustment gain for the collision avoidance brake based on the overlap rate, and by the operation suppression gain calculated in the step S306, thereby resulting in the final control intervention threshold value for the collision avoidance brake.

If it is determined that control intervention by warning is necessary, the warning actuator manipulation unit 208, which is constituted by a buzzer or a single buzzer mounted in the combination meter, causes the warning buzzer to sound according to the warning buzzer operation request transmitted from the control-intervention determination unit 207 (step S308).

If it is determined that the risk of the collision is not avoided even by the control intervention through the warning, thereby necessitating control intervention through braking, the braking actuator manipulation unit 209, which is mounted in a brake actuator such as a side slip prevention device, applies a braking force to the vehicle 100 according to the collision avoidance brake operation request and the required speed reduction (the predetermined requested speed reduction value) transmitted from the control-intervention determination unit 207 (step S309).

Figure 8:
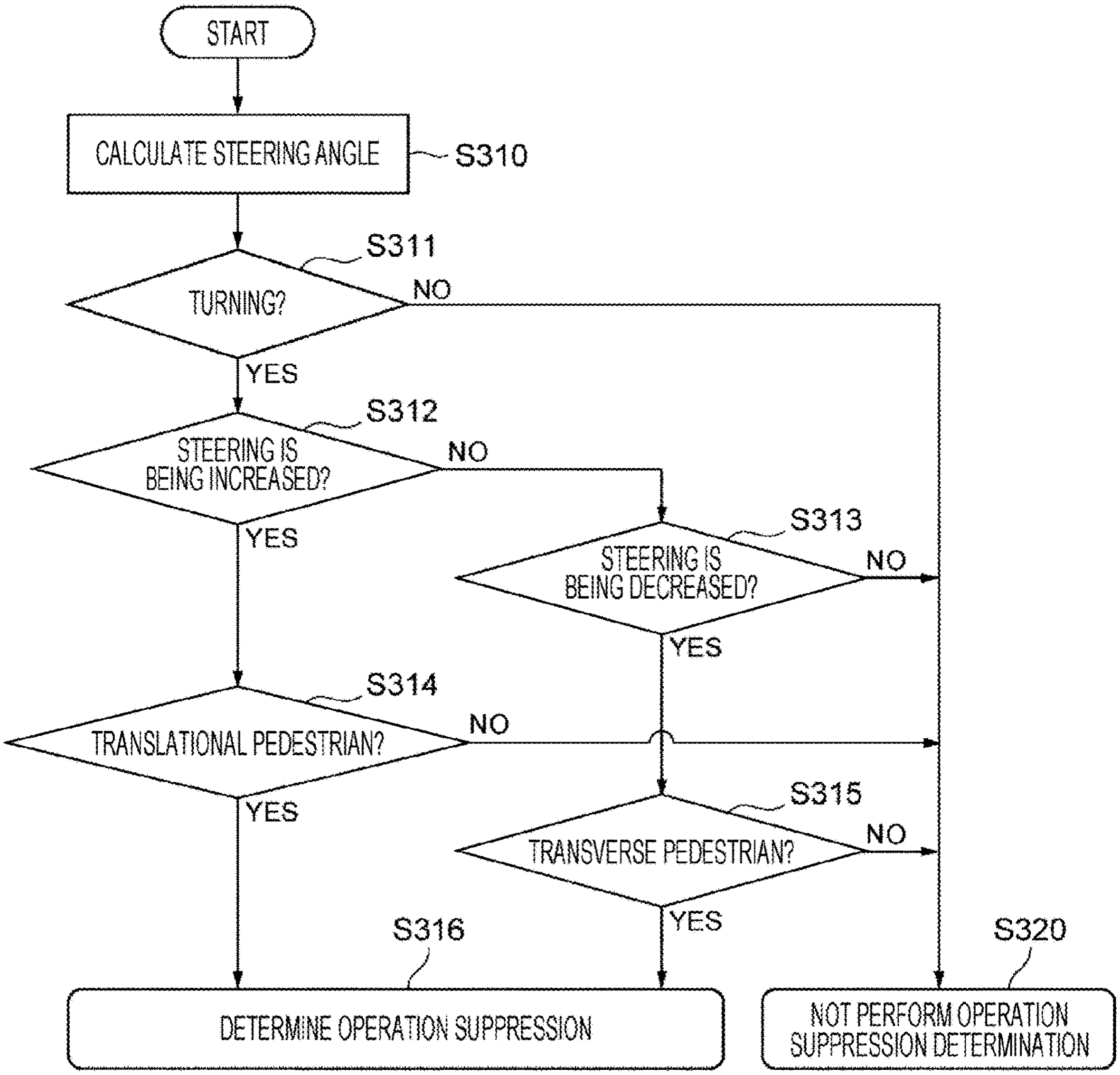
FIG. 8 is a flowchart in an operation-suppression determination unit in the first example.

FIG. 8 is a flowchart in the operation-suppression determination unit 206 in the step S306.

In the operation-suppression determination unit 206, the steering angular speed calculation unit 210 calculates the current steering angular speed (the rightward steering speed or the leftward steering speed) by performing time-differentiation on the steering angle information obtained from the vehicle-information acquisition unit 202 (step S310).

The turning direction determination unit 211 performs turning determination as to which direction the own vehicle is currently turning in, from the steering angle information and the yaw rate information obtained from the vehicle-information acquisition unit 202 (step S311). As an example of the turning determination method, respective turning determination threshold values are provided for the steering angle and the yaw rate, and if both the current steering angle and the current yaw rate exceed the rightward turning determination threshold values, it is determined that the own vehicle is turning rightward, and if the current steering angle and the current yaw rate exceed the leftward turning determination threshold values, it is determined that the own vehicle is turning leftward. If either or both of the steering angle and the yaw rate do not exceed the leftward and rightward turning determination threshold values, it is determined that the own vehicle is not turning, namely, the own vehicle is traveling straight, and it is not determined to perform operation suppression (step S320).

When it has been determined, in the step S311, that the own vehicle is turning rightward, if the steering angular speed determined in the step S310 is outputted to have a predetermined value or more in the rightward steering direction, the steering-increase determination unit 212 determines that the steering is being increased. Further, when it has been determined, in the step S311, that the own vehicle is turning leftward, if the steering angular speed determined in the step S310 is outputted to have a predetermined value or more in the leftward steering direction, the steering-increase determination unit 212 determines that the steering is being increased (step S312).

When it has been determined, in the step S311, that the own vehicle is turning rightward, if the steering angular speed determined in the step S310 is outputted to have a predetermined value or more in the leftward steering direction, the steering-decrease determination unit 213 determines that the steering is being decreased. Further, when it has been determined, in the step S311, that the own vehicle is turning leftward, if the steering angular speed determined in the step S310 is outputted to have a predetermined value or more in the rightward steering direction, the steering-decrease determination unit 213 determines that the steering is being decreased (step S313). Incidentally, the processing in the step S312 and the step S313 may be reversed in order. If the steering speed does not reach the predetermined value and, therefore, it cannot be determined that the steering is being increased or the steering is being decreased, it can be determined that the own vehicle is traveling through the intersection along a steady circle, which does not necessitate operation suppression. Therefore, it is not determined to perform operation suppression (step S320).

When it can be determined that the steering is being increased during rightward or leftward turning of the own vehicle, the translational-pedestrian determination unit 214 determines whether or not the target object is a translational pedestrian which is unlikely to collide with the own vehicle (therefore, which is to be subjected to operation suppression) (step S314 in FIG. 8).

Figure 9A:
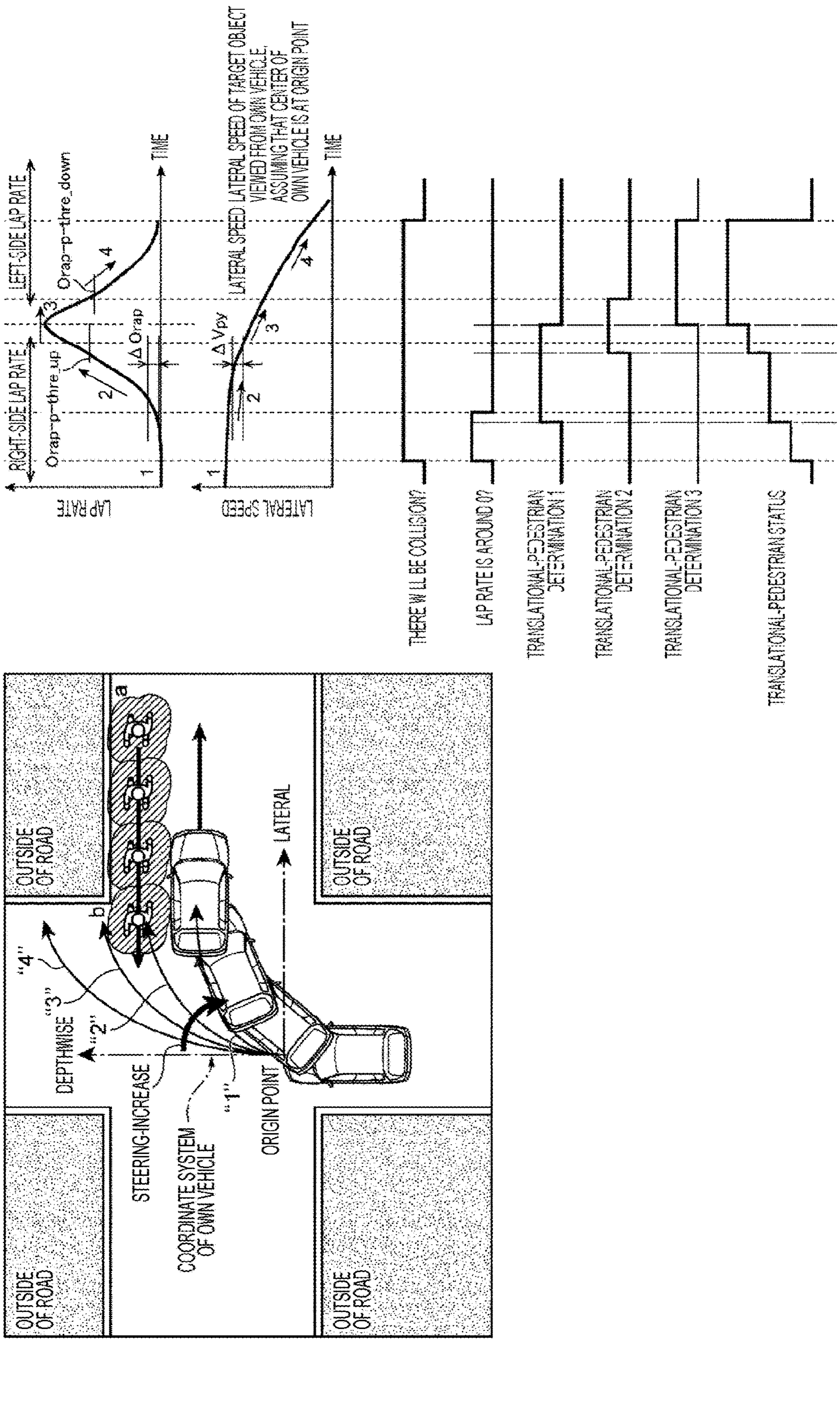
FIG. 9A is a conceptual view and a time chart of translational pedestrian determination in the translational-pedestrian determination unit in the first example.
Figure 9B:
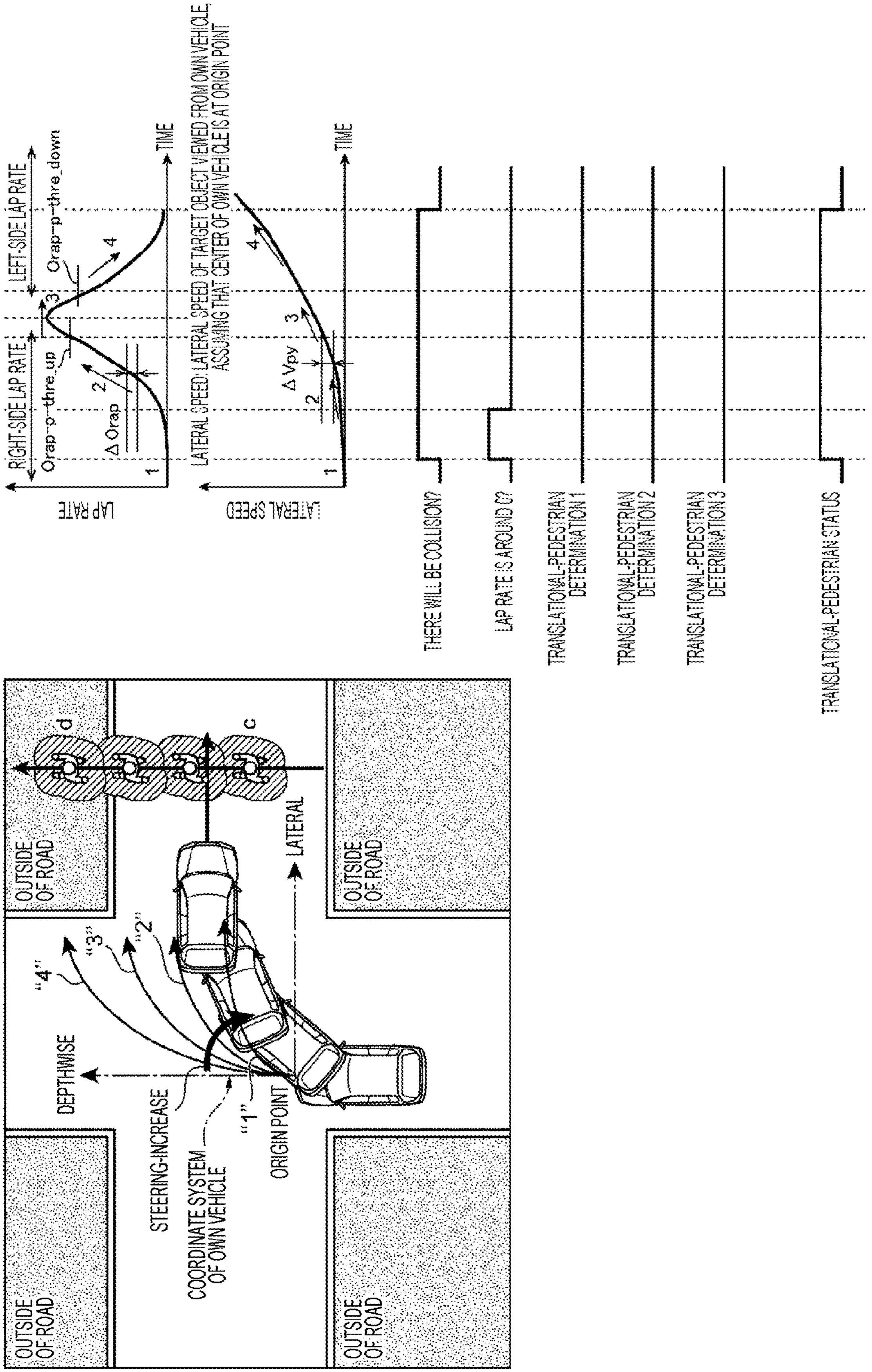
FIG. 9B is a conceptual view and a time chart of translational pedestrian determination in the translational-pedestrian determination unit (a scene of an erroneous operation of when the determination is performed only with the overlap rate) in the first example.

FIG. 9A illustrates a conceptual view and a time chart of translational pedestrian determination. Determination is made as to whether or not a target object (pedestrian) likely to collide with the own vehicle travelling through an intersection is translationally travelling with respect to the own vehicle at the exit of the intersection, based on the tendency (pattern) of generation of the overlap rate of the target object to the own vehicle (which generates in the left and right sides of the own vehicle with respect to the turning direction of the own vehicle), and based on the tendency (pattern) of generation of the lateral speed of the target object viewed from the own vehicle. There will be exemplified translational pedestrian determination during steering-increase in rightward turning. It is assumed that the own vehicle turns rightward at an intersection, while a target object (pedestrian) travels from a point "a" to a point "b" in the intersection in a uniform linear motion. In a case where the pedestrian viewed from the own vehicle travels translationally with respect to the own vehicle at the intersection exit, at first, the determination of collision between the own vehicle and the target object is started from when the overlap rate between the own vehicle and the target object is about 0 in the right side. From then, the overlap rate in the right side reaches a peak, and a transition occurs to the overlap rate in the left side. After the transition to the overlap rate in the left side, the overlap rate has a tendency to decrease (tendency to fall), and, then, the overlap rate becomes around 0, and, finally, the collision determination is no longer performed. At this time, if the translational pedestrian determination is performed only with the overlap rate, the translational pedestrian cannot be distinguished from a forward-traversing pedestrian passing through the intersection while traveling from a point "c" to a point "d" in FIG. 9B. Therefore, in the translational pedestrian determination, the lateral speed of the target object (pedestrian) viewed from the own vehicle is also simultaneously observed. Since the own vehicle is turning when traveling through the intersection, the coordinate axes of the own vehicle change from moment to moment along with the turning. Therefore, even though the target object is performing a uniform linear motion from the point "a" to the point "b", the lateral speed of the target object viewed from the own vehicle decreases from the initial phase to the latter phase of the turning (FIG. 9A). By observing this feature simultaneously with the tendency (pattern) of generation of the overlap rate, it is possible to determine that the target object is a translational pedestrian. Since the lateral speed of the transverse pedestrian in FIG. 9B increases as the own vehicle turns, it is possible to distinguish the transverse pedestrian from the translational pedestrian in FIG. 9A. The same applies to the translational pedestrian determination during steering-increase in leftward turning (see also FIG. 9D).

Figure 9C:
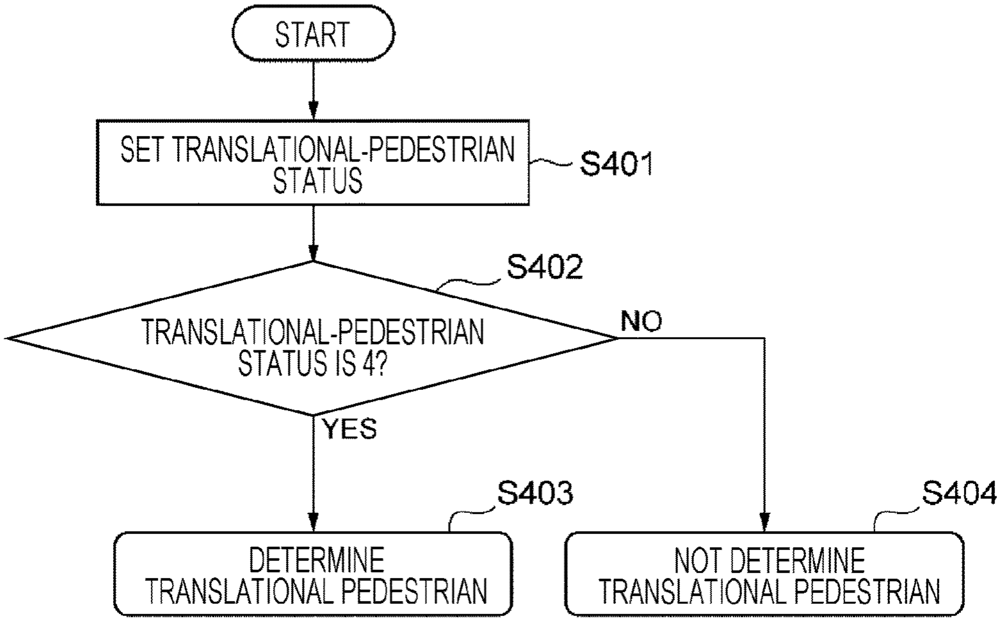
FIG. 9C is a flowchart in a translational-pedestrian determination unit in the first example.

FIG. 9C illustrates a flowchart of translational pedestrian determination. In the translational pedestrian determination, in order to determine that the target object is a translational pedestrian, there are provided translational pedestrian statuses in four stages, according to the target object determination state (step S401). When the translational pedestrian status is 4 (step S402), it is determined that the target object is a translational pedestrian (step S403), and otherwise (step S402), it is determined that the target object is not a translational pedestrian (step S404).

Figure 9D:
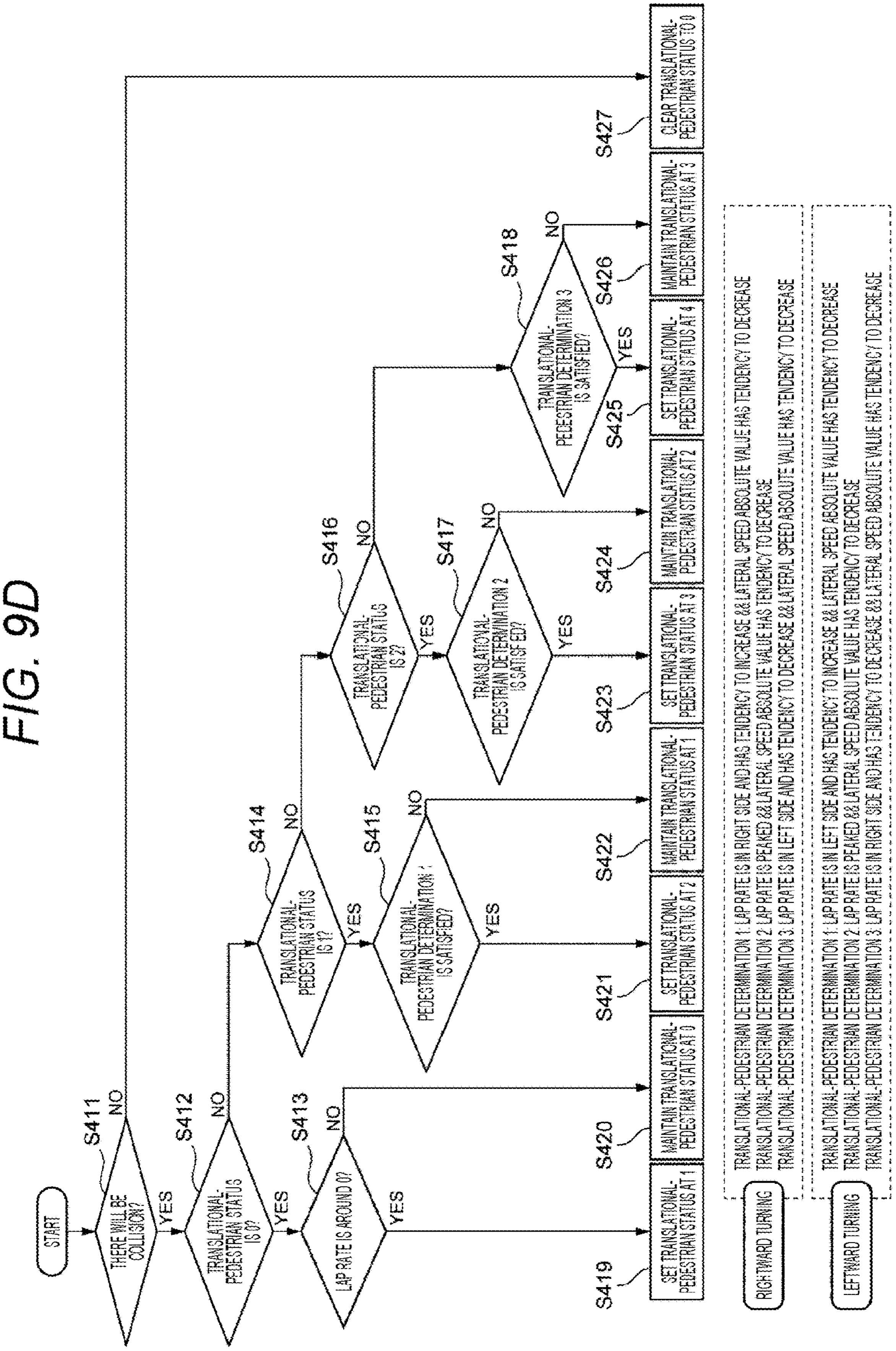
FIG. 9D is a flowchart for setting a translational pedestrian status in the translational-pedestrian determination unit in the first example.

FIG. 9D illustrates a flowchart for setting the translational pedestrian status. First, it is determined whether the collision presence/absence result from the collision determination unit 205 indicates that there will be a collision (step S411). If there will be no collision, the translational pedestrian status is reset to 0 regardless of the value thereof (step S427). If there will be a collision, it is determined whether the current translational pedestrian status is 0 (step S412). If the status is not 0, the processing proceeds to determination as to whether the translational pedestrian status is 1 (step S414). If the status is 0, it is determined whether the overlap rate PreOverLap($t_f$) between the own vehicle and the target object is around 0 (step S413). (PreOverLap($t_f$)≤predetermined value) If the overlap rate is around 0, the translational pedestrian status is set to 1 (step S419), and if the overlap rate is not around 0, the translational pedestrian status is maintained at 0 (step S420).

Next, when there will be a collision, it is determined whether the current translational pedestrian status is 1 (step S414). If the current translational pedestrian status is not 1, the processing proceeds to determination as to whether the current translational pedestrian status is 2 (step S416). If the current translational pedestrian status is 1, it is determined whether or not a translational pedestrian determination 1 is satisfied (step S415). Regarding the translational pedestrian determination 1, when the own vehicle is turning rightward, if the overlap rate between the own vehicle and the target object is calculated in the right side and has a tendency to increase, while the lateral speed has a tendency to decrease (FIG. 9A), the translational pedestrian determination 1 is satisfied. At this time, the tendency of the overlap rate to increase is determined based on the fact that the overlap rate changes toward in the plus direction per time unit. Further, the tendency of the lateral speed to decrease is determined based on the fact that the absolute value of the lateral speed changes in the minus direction per time unit. When the translational pedestrian determination is 1 satisfied, the translational pedestrian status is set at 2 (step S421). If the translational pedestrian determination 1 cannot be satisfied, the translational pedestrian status is maintained at 1 (step S422).

Next, when there will be a collision, it is determined whether the current translational pedestrian status is 2 (step S416). If the current translational pedestrian status is not 2, the processing proceeds to determination as to whether the translational pedestrian determination 3 is satisfied (step S418). If the current translational pedestrian status is 2, it is determined whether or not the translational pedestrian determination 2 is satisfied (step S417). Regarding the translational pedestrian determination 2, if there is a transition of the overlap rate from the right side to the left side, and the overlap rate is peaked, and the lateral speed of the target object viewed from the own vehicle has a tendency to decrease (FIG. 9A), the translational pedestrian determination 2 is satisfied. At this time, the peak of the overlap rate is detected, based on the fact that the overlap rate comes to have a predetermined value or more in the right side, thereafter there is a shift to the overlap rate in the left side, and then the overlap rate comes to have a predetermined value or less. Further, the tendency of the lateral speed to decrease is determined based on the fact that the absolute value of the lateral speed changes in the minus direction per time unit. If the translational pedestrian determination 2 is satisfied, the translational pedestrian status is set at 3 (step S423). If the translational pedestrian determination 2 cannot be satisfied, the translational pedestrian status is maintained at 2 (step S424).

Next, when there will be a collision, it is determined whether a translational pedestrian determination 3 is satisfied (step S418). Regarding the translational pedestrian determination 3, if the overlap rate is in the left side, there is observed a tendency of the overlap rate to decrease, and the lateral speed of the target object viewed from the own vehicle has a tendency to decrease, the translational pedestrian determination 3 is satisfied. At this time, the tendency of the overlap rate to decrease is decided based on the fact that the overlap rate changes in the minus direction per time unit. Further, the tendency of the lateral speed to decrease is determined based on the fact that the absolute value of the lateral speed changes in the minus direction per time unit. If the translational pedestrian determination 3 is satisfied, the translational pedestrian status is set at 4 (step S425). If the translational pedestrian determination 3 cannot be satisfied, the translational pedestrian status is maintained at 3 (step S426).

When it can be determined that the steering is being decreased during rightward or leftward turning of the own vehicle, the transverse-pedestrian determination unit 215 determines whether or not the target object is a transverse pedestrian which is unlikely to collide with the own vehicle (therefore, which is to be subjected to operation suppression) (step S315 in FIG. 8).

Figure 10A:
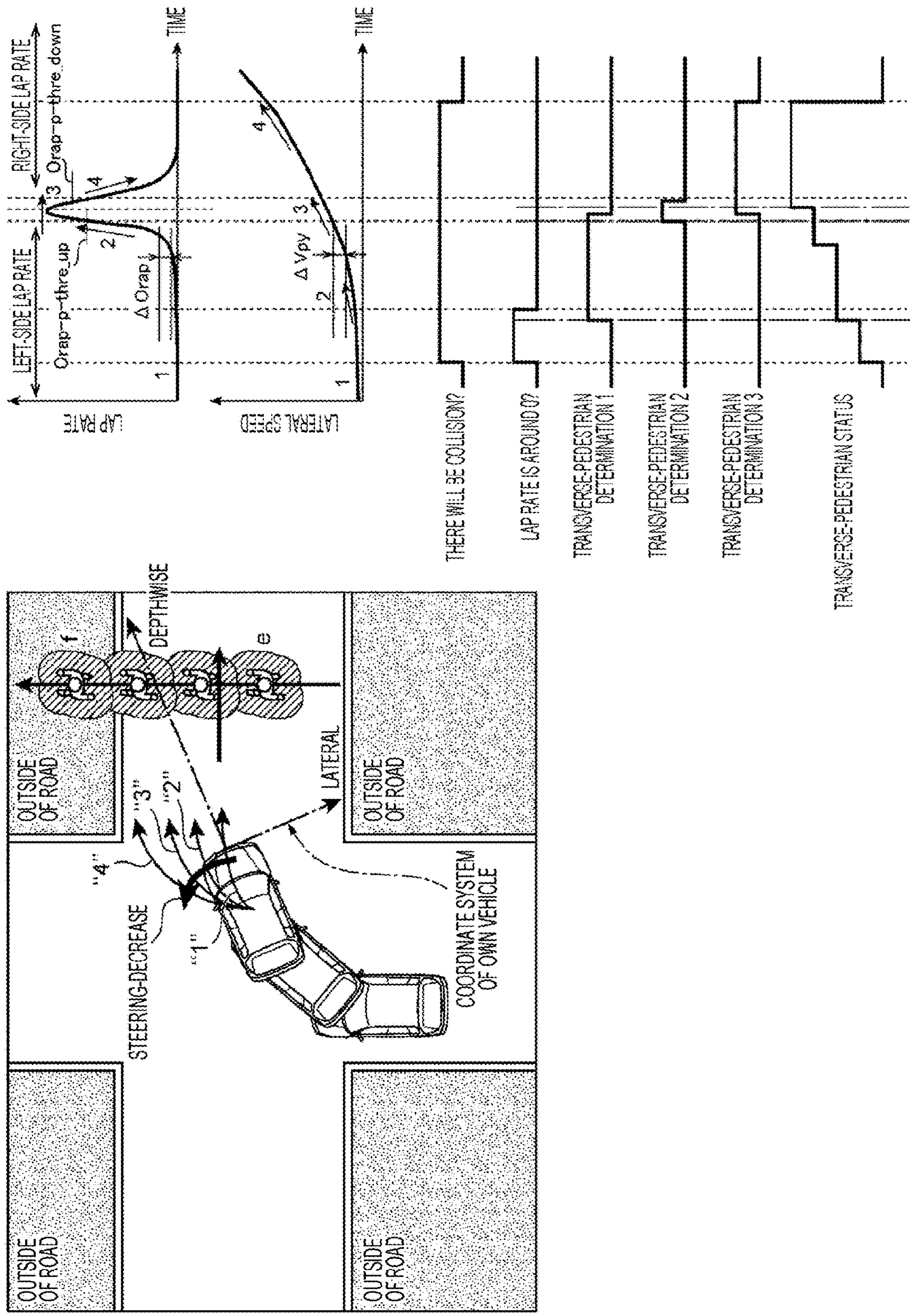
FIG. 10A is a conceptual view and a time chart of translational pedestrian determination in the translational-pedestrian determination unit in the first example.
Figure 10B:
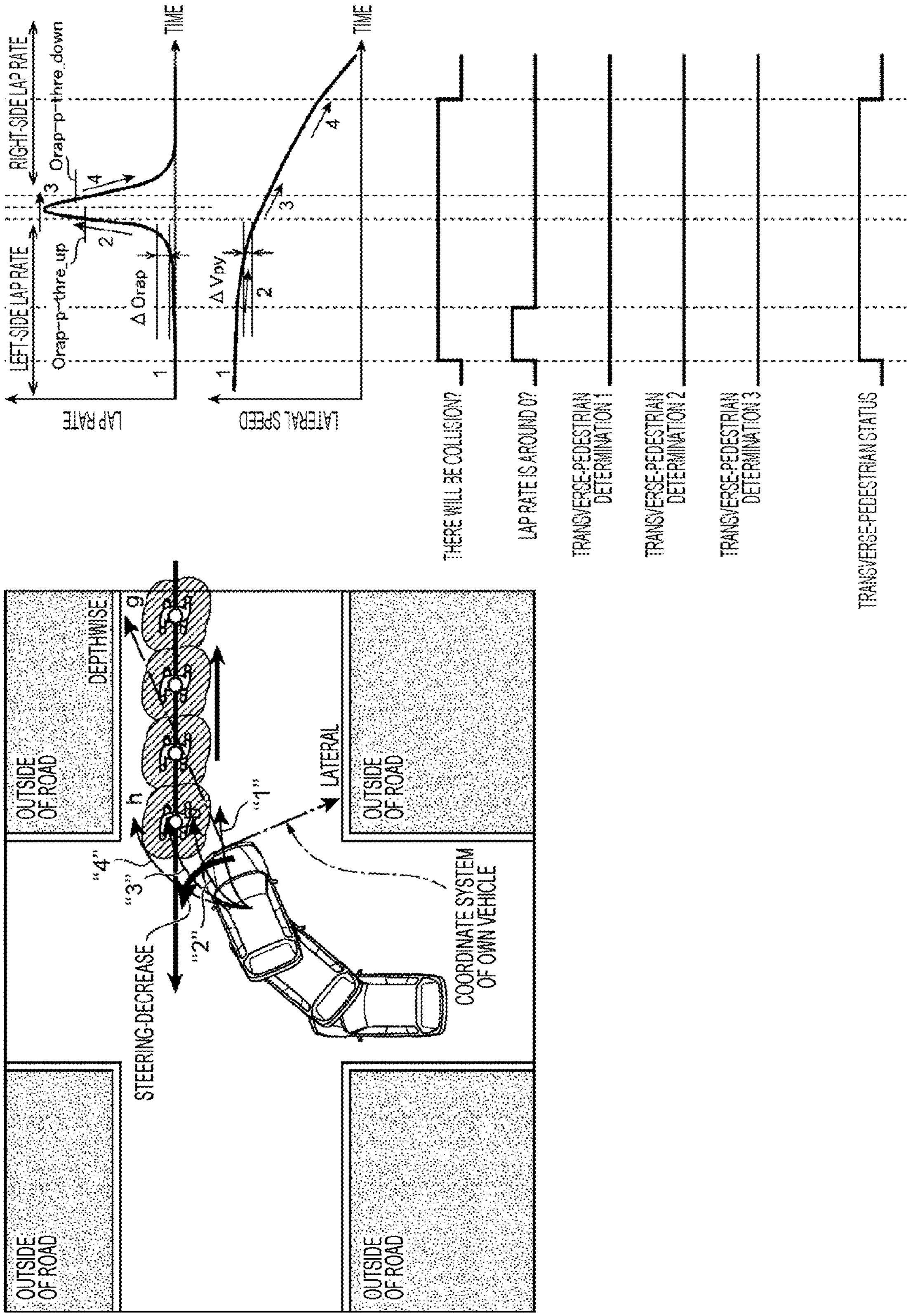
FIG. 10B is a conceptual view and a time chart of translational pedestrian determination in the translational-pedestrian determination unit (a scene of an erroneous operation of when the determination is performed only with the overlap rate) in the first example.

FIG. 10A illustrates a conceptual view and a time chart of the transverse pedestrian determination. Determination is made as to whether or not a target object (pedestrian) likely to collide with the own vehicle travelling through an intersection is traversing with respect to the own vehicle at the exit of the intersection, based on the tendency (pattern) of generation of the overlap rate of the target object to the own vehicle (which generates in the left and right sides of the own vehicle with respect to the turning direction of the own vehicle), and based on the tendency (pattern) of generation of the lateral speed of the target object viewed from the own vehicle. There will be exemplified transverse pedestrian determination during steering-decrease in rightward turning. It is assumed that the own vehicle turns rightward at an intersection, while a target object (pedestrian) travels from a point "e" to a point "f" in the intersection in a uniform linear motion. In a case where the pedestrian viewed from the own vehicle is orthogonal to the own vehicle at the intersection exit, at first, the determination of collision between the own vehicle and the target object is started from when the overlap rate between the own vehicle and the target object is about 0 in the left side. From then, the overlap rate in the left side reaches a peak, and a transition occurs to the overlap rate in the right side. After the transition to the overlap rate in the right side, the overlap rate has a tendency to decrease (tendency to fall), and, then, the overlap rate becomes around 0, and, finally, the collision determination is no longer performed. At this time, if the transverse pedestrian determination is performed only with the overlap rate, the transverse pedestrian cannot be distinguished from a forward-translational pedestrian passing through the intersection while traveling from a point "g" to a point "h" in FIG. 10B. Therefore, in the transverse pedestrian determination, the lateral speed of the target object (pedestrian) viewed from the own vehicle is also simultaneously observed. Since the own vehicle is turning when traveling through the intersection, the coordinate axes of the own vehicle change from moment to moment along with the turning. Therefore, even though the target object is performing a uniform linear motion from the point "e" to the point "f", the lateral speed of the target object viewed from the own vehicle increases from the initial phase to the latter phase of the turning (FIG. 10A). By observing this feature simultaneously with the tendency (pattern) of generation of the overlap rate, it is possible to determine that the target object is a transverse pedestrian. Since the lateral speed of the translational pedestrian in FIG. 10B decreases as the own vehicle turns, it is possible to distinguish the translational pedestrian from the transverse pedestrian in FIG. 10A. The same applies to the transverse pedestrian determination during steering-decrease in leftward turning (see also FIG. 10D).

Figure 10C:
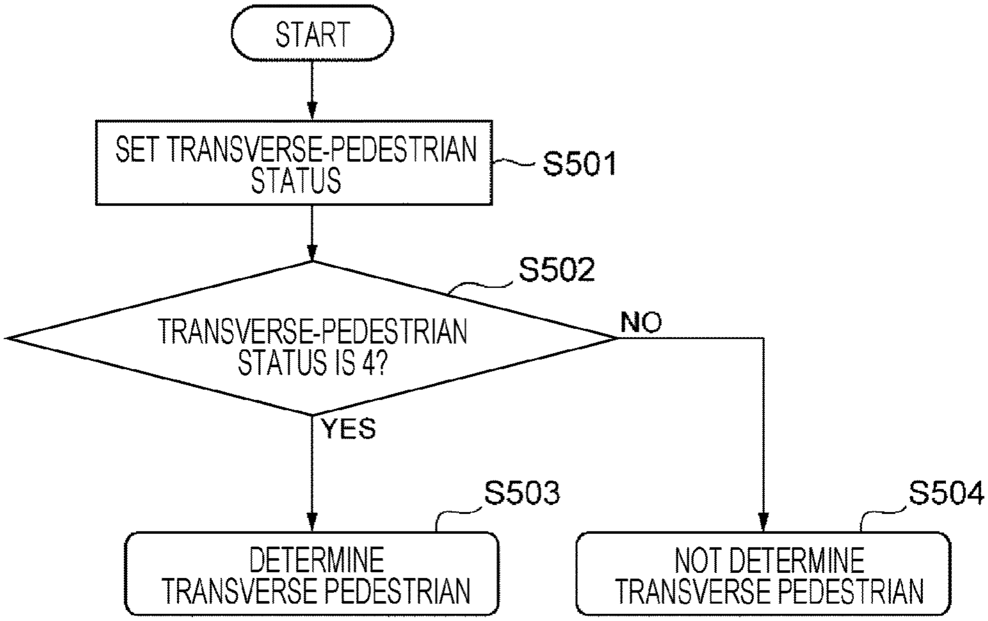
FIG. 10C is a flowchart of translational pedestrian determination in the first example.

FIG. 10C illustrates a flowchart of transverse pedestrian determination. In the transverse pedestrian determination, in order to determine that the target object is a transverse pedestrian, there are provided transverse pedestrian statuses in four stages, according to the target object determination state (step S501). When the transverse pedestrian status is 4 (step S502), it is determined that the target object is a transverse pedestrian (step S503), and otherwise (step S502), it is determined that the target object is not a transverse pedestrian (step S504).

Figure 10D:
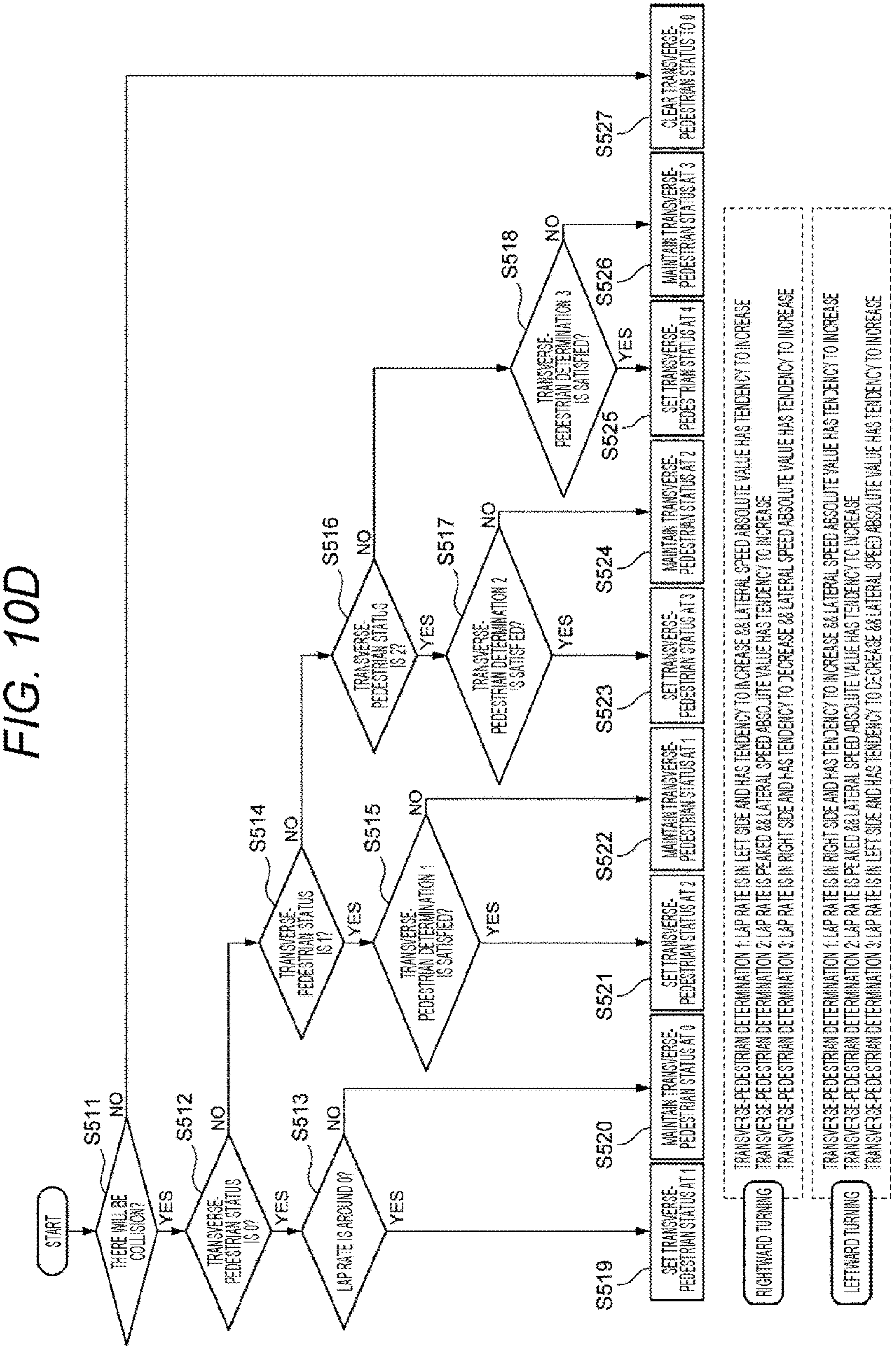
FIG. 10D is a flowchart for setting a translational pedestrian status in the translational-pedestrian determination unit in the first example.

FIG. 10D illustrates a flowchart for setting the transverse pedestrian status. First, it is determined whether the collision presence/absence result from the collision determination unit 205 indicates that there will be a collision (step S511). If there will be no collision, the transverse pedestrian status is reset to 0 regardless of the value thereof (step S527). If there will be a collision, it is determined whether the current transverse pedestrian status is 0 (step S512). If the status is not 0, the processing proceeds to determination as to whether the transverse pedestrian status is 1 (step S514). If the status is 0, it is determined whether the overlap rate PreOverLap($t_f$) between the own vehicle and the target object is around 0 (step S513). (PreOverLap($t_f$)≤predetermined value) If the overlap rate is around 0, the transverse pedestrian status is set to 1 (step S519), and if the overlap rate is not around 0, the transverse pedestrian status is maintained at 0 (step S520).

Next, when there will be a collision, it is determined whether the current transverse pedestrian status is 1 (step S514). If the current transverse pedestrian status is not 1, the processing proceeds to determination as to whether the current transverse pedestrian status is 2 (step S516). If the current transverse pedestrian status is 1, it is determined whether or not a transverse pedestrian determination 1 is satisfied (step S515). Regarding the transverse pedestrian determination 1, when the own vehicle is turning rightward, if the overlap rate between the own vehicle and the target object is calculated in the left side and has a tendency to increase, while the lateral speed has a tendency to increase (FIG. 10A), the transverse pedestrian determination 1 is satisfied. At this time, the tendency of the overlap rate to increase is determined based on the fact that the overlap rate changes toward in the plus direction per time unit. Further, the tendency of the lateral speed to increase is determined based on the fact that the absolute value of the lateral speed changes in the plus direction per time unit. When the transverse pedestrian determination 1 is satisfied, the transverse pedestrian status is set at 2 (step S521). If the transverse pedestrian determination 1 cannot be satisfied, the transverse pedestrian status is maintained at 1 (step S522).

Next, when there will be a collision, it is determined whether the current transverse pedestrian status is 2 (step S516). If the current transverse pedestrian is not 2, the processing proceeds to determination as to whether the transverse pedestrian determination 3 is satisfied (step S518). If the current transverse pedestrian status is 2, it is determined whether or not the transverse pedestrian determination 2 is satisfied (step S517). Regarding the transverse pedestrian determination 2, if there is a transition of the overlap rate from the left side to the right side, and the overlap rate is peaked, and the lateral speed of the target object viewed from the own vehicle has a tendency to increase (FIG. 10A), the transverse pedestrian determination 2 is satisfied. At this time, the peak of the overlap rate is detected, based on the fact that the overlap rate comes to have a predetermined value or more in the left side, thereafter there is a shift to the overlap rate in the right side, and then the overlap rate comes to have a predetermined value or less. Further, the tendency of the lateral speed to increase is determined based on the fact that the absolute value of the lateral speed changes in the plus direction per time unit. If the transverse pedestrian determination 2 is satisfied, the transverse pedestrian status is set at 3 (step S523). If the transverse pedestrian determination 2 cannot be satisfied, the transverse pedestrian status is maintained at 2 (step S524).

Next, when there will be a collision, it is determined whether a transverse pedestrian determination 3 is satisfied (step S518). Regarding the transverse pedestrian determination 3, if the overlap rate is in the right side, there is observed a tendency of the overlap rate to decrease, and the lateral speed of the target object viewed from the own vehicle has a tendency to increase, the transverse pedestrian determination 3 is satisfied. At this time, the tendency of the overlap rate to decrease is decided based on the fact that the overlap rate changes in the minus direction per time unit. Further, the tendency of the lateral speed to increase is determined based on the fact that the absolute value of the lateral speed changes in the plus direction per time unit. If the transverse pedestrian determination 3 is satisfied, the transverse pedestrian status is set at 4 (step S525). If the transverse pedestrian determination 3 cannot be satisfied, the transverse pedestrian status is maintained at 3 (step S526).

Figure 11A:
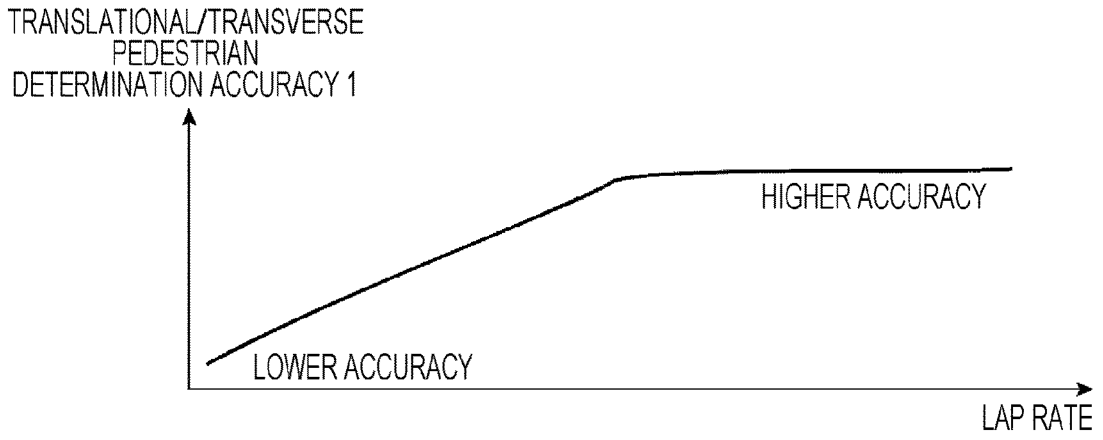
FIG. 11A is a view of relationship between the overlap rate and determination accuracy.
Figure 11B:
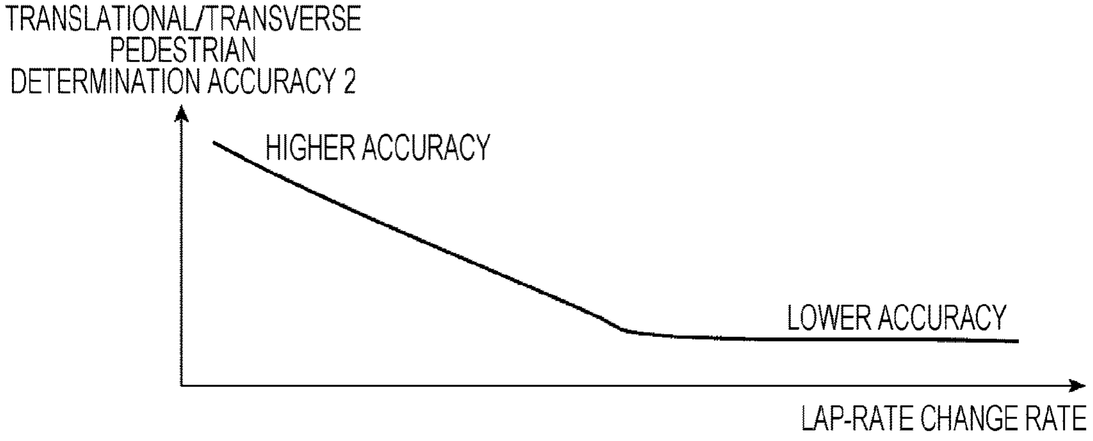
FIG. 11B is a view of relationship between a change rate of the overlap rate and determination accuracy.
Figure 11C:
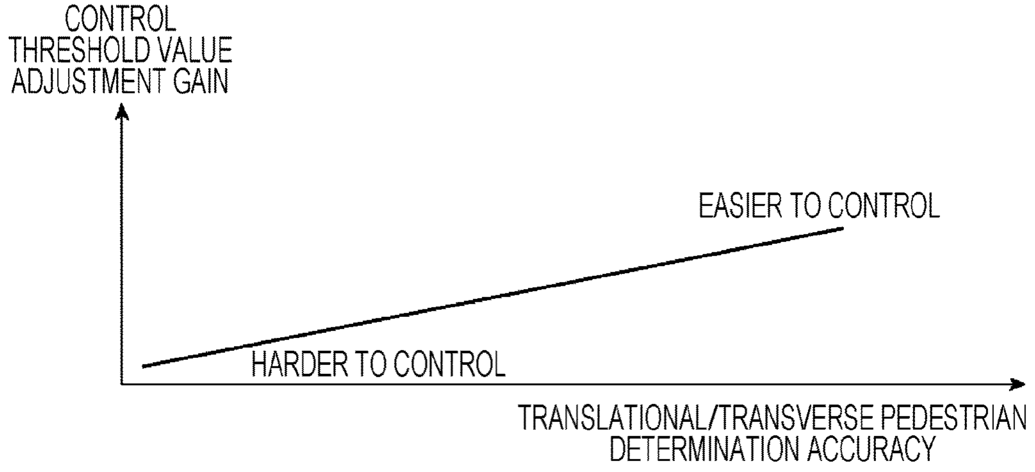
FIG. 11C is a view of relationship between determination accuracy and a control threshold value adjustment gain.

The operation-suppression determination unit 206 observes the translational pedestrian determination during steering-increase manipulation, the transverse pedestrian determination during steering-decrease, and the overlap rate between the own vehicle and the pedestrian. Regarding the translational pedestrian determination and the transverse pedestrian determination, the operation-suppression determination unit 206 evaluates the accuracy of the determination. The accuracy of the translational pedestrian determination and the transverse pedestrian determination is evaluated by the current overlap rate, and the change rate of the overlap rate (See both FIGS. 9A and 10A). When the current overlap rate is higher, there is a lower probability that the pedestrian is a translational pedestrian during steering-increase or a transverse pedestrian during steering-decrease (namely, there is a lower probability of erroneous operations), and thus the accuracy is lower. On the other hand, when the current overlap rate is lower, there is a higher possibility that the pedestrian is a pedestrian who will not collide with the own vehicle and, thus, the translational pedestrian determination during steering-increase and the transverse pedestrian determination during steering-decrease has higher accuracy. This accuracy is set by map drawing as illustrated in FIG. 11A, as translational/transverse pedestrian determination accuracy 1. Next, regarding the change rate of the overlap rate, the higher this change rate, the higher the possibility of collision, and, therefore, the higher the possibility (accuracy) that the pedestrian is a translational/transverse pedestrian. Conversely, the lower the change rate, the lower the possibility of collision, and thus the higher the possibility (accuracy) that the pedestrian is a translational/transverse pedestrian. Therefore, the translational/transverse pedestrian determination accuracy based on the change rate of the overlap rate is set by map drawing as illustrated in FIG. 11B, as translational/transverse pedestrian determination accuracy 2. The final translational/transverse pedestrian determination accuracy is determined from the translational/transverse pedestrian determination accuracy 1 and the translational/transverse pedestrian determination accuracy 2. The final translational/transverse pedestrian determination accuracy may be either calculated by multiplying the accuracy 1 and the accuracy 2, or calculated by select-high or select-low of both the accuracy 1 and the accuracy 2. Then, a control threshold-value adjustment gain as illustrated in FIG. 11C is set according to the translational/transverse pedestrian determination accuracy.

In the operation-suppression determination unit 206, the result-of-operation-suppression-determination output unit 216 transmits the aforementioned "translational pedestrian determination during steering-increase", "transverse pedestrian determination during steering-decrease", and "the control threshold value adjustment gain", to the control-intervention determination unit 207 (step S316 in FIG. 8). Based on the transmitted control threshold value adjustment gain, the control-intervention determination unit 207 adjusts a control intervention threshold value, which serves as a reference for the control intervention determination described above.

As described above, the vehicle control controller (vehicle control device) 200 in the present example includes: the external-field recognition unit 201 adapted to recognize information about a field outside the own vehicle, which is typified by a camera, a radar, or the like; the vehicle-information acquisition unit 202 adapted to acquire states (the speed, the steering angle, the yaw rate, and the like) of the own vehicle; the collision determination unit 205 adapted to determine a collision between a target object and the own vehicle, based on information about the target object (a pedestrian or the like) around the own vehicle acquired by the external-field recognition unit 201, and based on the states of the own vehicle acquired by the vehicle-information acquisition unit 202; and the operation-suppression determination unit 206 adapted to determine whether to change a result of the collision determination (whether to suppress an unnecessary operation), based on a change (temporal change) of a lap rate between the target object and the own vehicle, and based on a change (temporal change) of a lateral speed generated in the target object with respect to the own vehicle, when the collision determination unit 205 determines a collision; and the control-intervention determination unit 207 adapted to determine control intervention in the own vehicle (with respect to the target object) from results from the collision determination unit 205 and the operation-suppression determination unit 206.

The operation-suppression determination unit 206 determines a turning direction of the own vehicle, and determines that the target object is a translational/transverse pedestrian to be subjected to operation suppression, from the pattern of generation of the lap rate, which is generated in the left and right sides of the own vehicle with respect to the turning direction of the own vehicle, and from the pattern of generation of the lateral speed (FIG. 9A/FIG. 10A).

In the present example, for example, it is possible to provide a vehicle control device capable of preventing unnecessary operations (excessive operations) for a pedestrian who will not actually collide with the own vehicle, such as a translational pedestrian, at an intersection that is not provided with an environment for separating the vehicle and the pedestrian from each other, such as a sidewalk or a crosswalk, thereby assisting appropriate avoidance of collision between the vehicle and the pedestrian.

Second Example

Next, a second example will be described. The basic structure in the second example is the same as that of the first example and will be described regarding its differences from the first example. In the first example, operation-suppression determination is performed through translational pedestrian determination during steering-increase and transverse pedestrian determination during steering-decrease. However, in the second example, in addition thereto, the parallelism/orthogonality between the own vehicle and a target object is determined from the relative speed of the target object when a collision is determined, wherein the relative speed is calculated by the collision determination unit 205 when a translational pedestrian is determined. Further, conditions for them are met, operation suppression is determined. In the second example, unlike in the first example, a speed vector of the pedestrian at the time of collision is evaluated, which enables further limiting the subject to be subjected to operation suppression.

Figure 12:
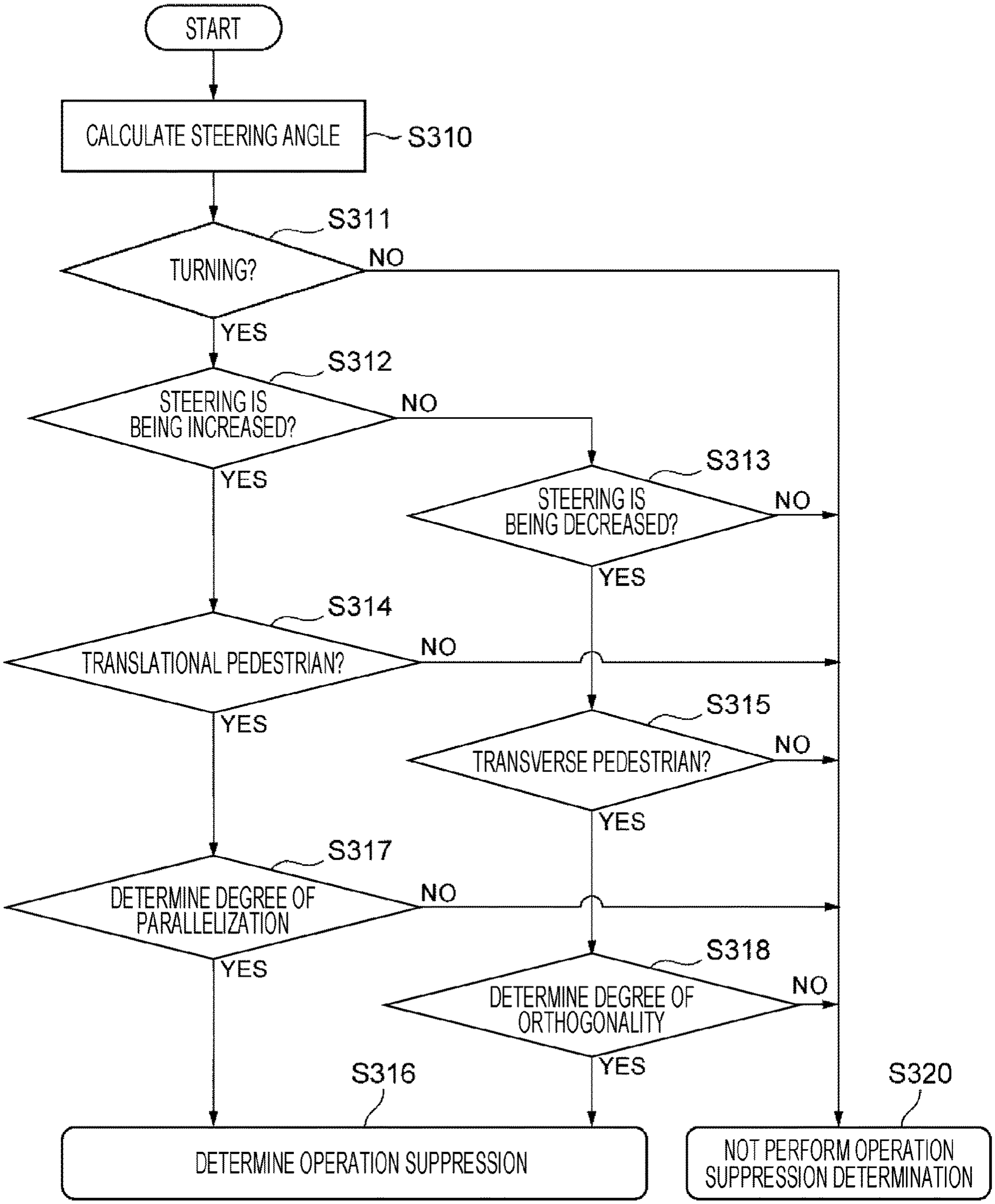
FIG. 12 is a flowchart in an operation-suppression determination unit in a second example.
Figure 13:
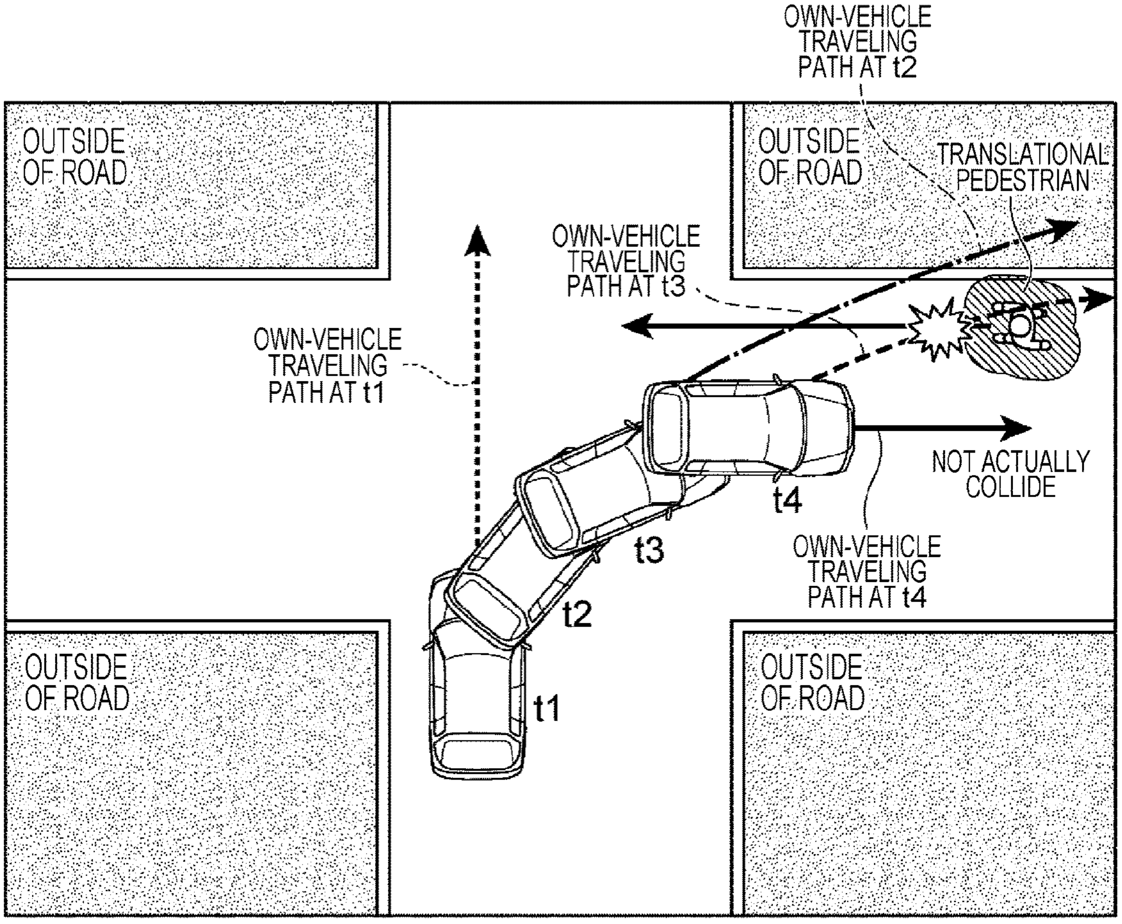
FIG. 13 is an overhead view of a scene where an erroneous operation (unnecessary operation) is induced.
Figure 14:
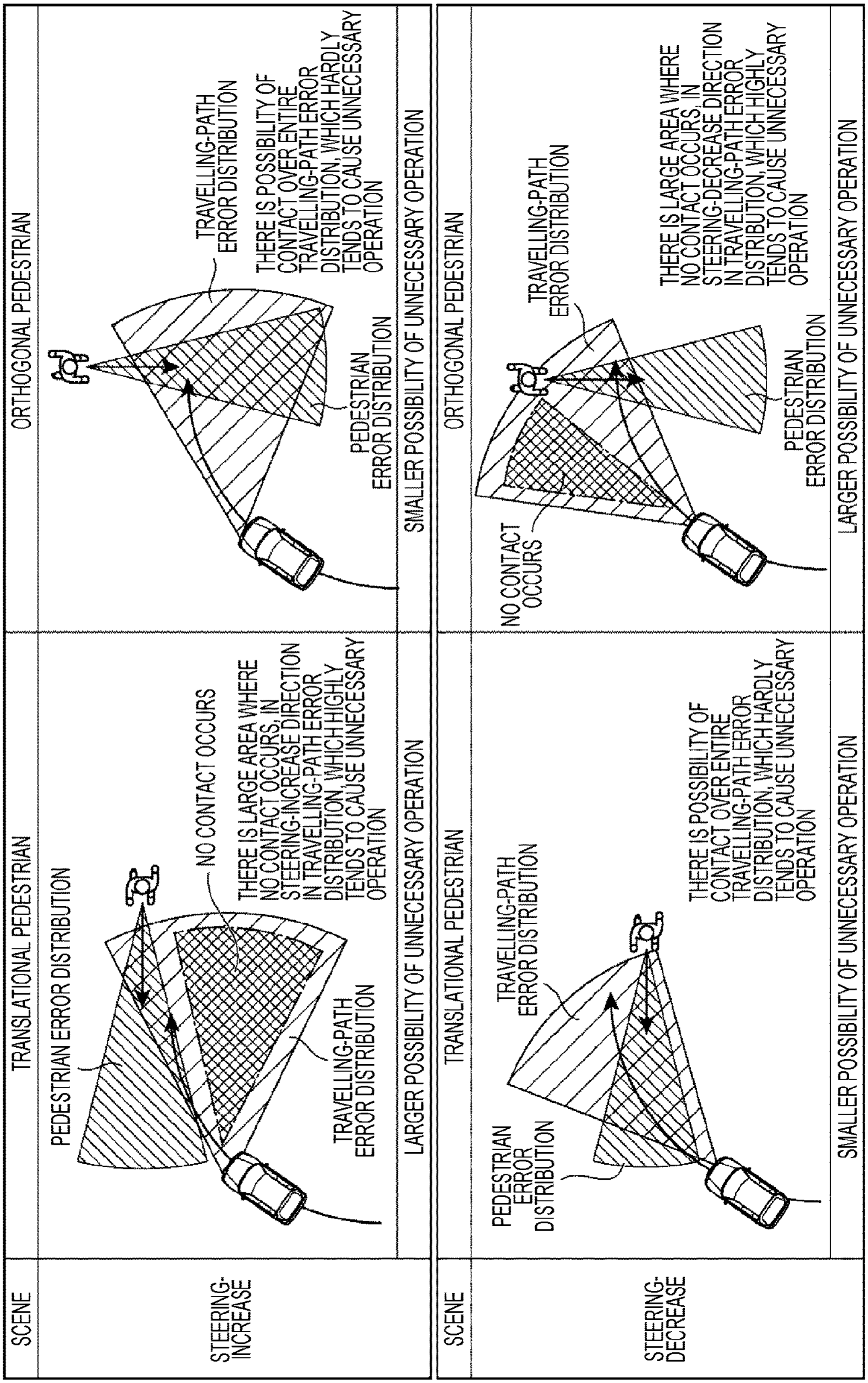
FIG. 14 is an explanation view of scenes where erroneous operations (unnecessary operations) are induced.

FIG. 12 illustrates a flowchart in the operation-suppression determination unit 206 in the second example. The steps S310 to S316 and S320 are the same as those in the first example and, therefore, the parallelism determination in step S317 and the orthogonality determination in step S318 will be described.

Regarding the parallelism determination in the step S317, when a collision is determined, and when a collision of the pedestrian is determined, it is assumed that the pedestrian has a speed vector Vxp and Vyp, and the speed vector and the own vehicle form an angle of Op. Thus, there is held the following: $\theta p=\tan^{-1}$ (Vyp/Vxp). If the following holds: Vyp/Vxp<Kp (Kp is a predetermined arctangent value), it is determined that the own vehicle and the target object are parallel with each other. If it is determined that the own vehicle and the target object are parallel, it is defined that the target object is a translational pedestrian to be subjected to operation suppression. If it is determined that the own vehicle and the target object are not parallel, operation suppression is not determined (step S320).

Regarding the orthogonality determination in the step S318, when a collision is determined, and when a collision of the pedestrian is determined, it is assumed that the pedestrian has a speed vector Vxp and Vyp, and the speed vector and the own vehicle form an angle of θp. Thus, there is held the following: $\theta p=\tan^{-1}$ (Vyp/Vxp). If the following holds: Vyp/Vxp>Kn (Kn is a predetermined arctangent value), it is determined that the own vehicle and the target object are orthogonal to each other. If it is determined that the own vehicle and the target object are orthogonal, it is defined that the target object is a transverse pedestrian to be subjected to operation suppression. If it is determined that the own vehicle and the target object are not orthogonal, operation suppression is not determined (step S320).

As described above, in the vehicle control controller (vehicle control device) 200 in the present example, the operation-suppression determination unit 206 defines the translational pedestrian or the transverse pedestrian to be subjected to the operation suppression, based on the speed vector of the pedestrian viewed from the own vehicle.

In the present example, for example, it is possible to further limit the subject of operation suppression, in the driving assistance function for avoiding the collision between the own vehicle and a pedestrian at an intersection that is not provided with an environment for separating the vehicle and the pedestrian from each other, such as a sidewalk or a pedestrian crossing.

Incidentally, the present invention is not limited to the aforementioned examples, and includes various modifications. For example, the aforementioned examples have been described in detail for the purpose of facilitating understanding of the present invention, and the present invention is not necessarily limited to the structure including all the described structures. Further, the structure in each example can be partially provided with other additional structures, eliminated or replaced with other structures.

Further, some or all of the aforementioned structures, functions, processing units, processing means, and the like may be realized through hardware, for example, by being designed with an integrated circuit. Further, the present invention can also be realized by a program code for software capable of realizing the functions in the examples. In this case, a storage medium recording the program code therein is provided to a computer, and a processor included in the computer is caused to read the program code stored in the storage medium. In this case, the program code itself having been read from the storage medium is caused to realize the functions in the aforementioned examples, so that the program code itself and the storage medium storing the program code constitute the present invention. As a storage medium for supplying such a program code, for example, it is possible to use a flexible disk, a CD-ROM, a DVD-ROM, a hard disk, a solid state drive (SSD), an optical disk, a magneto-optical disk, a CD-R, a magnetic tape, a non-volatile memory card, a ROM, or the like.

Furthermore, a program code of software that realizes the functions of the examples may be distributed via a network to be stored in a storage means such as a hard disk or a memory of a computer or a storage medium such as a CD-RW or a CD-R, and a processor included in the computer may read and execute the program code stored in the storage means or the storage medium.

In the aforementioned examples, there are illustrated control lines and information lines considered to be necessary for the description, and not all the control lines and the information lines in the product are illustrated. All the structures may be connected to each other.

REFERENCE SIGNS LIST

100 vehicle
101 left front wheel
102 right front wheel
103 left rear wheel
104 right rear wheel
105, 106, 107, 108 wheel cylinder
109 wheel-cylinder hydraulic control device
110 steering device
111 external-field recognition sensor
112 external-field recognition controller
113 engine
200 vehicle control controller (vehicle control device)
201 external-field recognition unit
202 vehicle-information acquisition unit
203 own-vehicle traveling path estimation unit
204 target-object traveling path estimation unit
205 collision determination unit
206 operation-suppression determination unit
207 control-intervention determination unit
208 warning actuator manipulation unit
209 braking actuator manipulation unit
210 steering angular speed calculation unit
211 turning direction determination unit
212 steering-increase determination unit
213 steering-decrease determination unit
214 translational-pedestrian determination unit
215 traversing-pedestrian determination unit
216 result-of-operation-suppression-determination output unit

The invention claimed is:

1. A vehicle control device comprising:

an external-field sensor configured to recognize information about a field outside an own vehicle;

a vehicle-state sensor configured to acquire a state of the own vehicle; and a controller in communication with the external-field sensor and the vehicle-state sensor, the controller being configured to:

determine a collision between a target object and the own vehicle, based on information about the target object around the own vehicle acquired by the external-field sensor, and based on the state of the own vehicle acquired by the vehicle-state sensor;

determine, when the collision is determined, whether to change a result of the collision determination, based on a change of a lap rate between the target object and the own vehicle, and based on a change of a lateral speed generated in the target object with respect to the own vehicle;

determine a turning direction of the own vehicle;

determine that the target object is a translational pedestrian to be subjected to operation suppression, based on a pattern of generation of the lap rate generated in left and right sides of the own vehicle with respect to the turning direction of the own vehicle, and based on a pattern of generation of the lateral speed; and determine control intervention in the own vehicle, from the collision determination and the determination of whether to change the result of the collision determination.

2. The vehicle control device according to claim 1, wherein the controller is further configured to determine steering-increase during turning of the own vehicle, and determine that the target object is a translational pedestrian to be subjected to operation suppression, based on the pattern of generation of the lap rate generated in the left and right sides of the own vehicle with respect to the turning direction of the own vehicle, and based on the pattern of generation of the lateral speed.

3. The vehicle control device according to claim 1, wherein the controller is further configured to determine steering-increase during turning of the own vehicle, and determine that the target object is a translational pedestrian to be subjected to operation suppression, based on the pattern of generation of the lap rate which increases in the right side of the own vehicle and decreases in the left side of the own vehicle during steering-increase in rightward turning of the own vehicle, or the pattern of generation of the lap rate which increases in the left side of the own vehicle and decreases in the right side of the own vehicle during steering-increase in leftward turning of the own vehicle, and based on the pattern of generation of the lateral speed which decreases during turning of the own vehicle.

4. The vehicle control device according to claim 1, wherein the controller is further configured to calculate accuracy of the translational pedestrian determination based on at least one of the lap rate and a change rate of the lap rate, and set a control threshold value adjustment gain for adjusting a control intervention threshold value serving as a reference for control intervention determination, based on the accuracy of the translational pedestrian determination.

5. The vehicle control device according to claim 1, wherein the controller is further configured to calculate the accuracy of the translational pedestrian determination such that the lower the lap rate or the smaller the change rate of the lap rate, the higher the accuracy, and set a control threshold value adjustment gain for adjusting a control intervention threshold value serving as a reference for control intervention determination, based on the accuracy of the translational pedestrian determination.

6. The vehicle control device according to claim 1, wherein the controller is further configured to define the translational pedestrian to be subjected to the operation suppression, from a speed vector of the pedestrian viewed from the own vehicle.

7. The vehicle control device according to claim 1, wherein the controller is further configured to define the translational pedestrian to be subjected to the operation suppression, from parallelism between the own vehicle and the pedestrian, which is determined from a speed vector of the pedestrian viewed from the own vehicle.

8. A vehicle control device comprising:

an external-field sensor configured to recognize information about a field outside an own vehicle;

a vehicle-state sensor configured to acquire a state of the own vehicle; and a controller in communication with the external-field sensor and the vehicle-state sensor, the controller being configured to:

determine a collision between a target object and the own vehicle, based on information about the target object around the own vehicle acquired by the external-field sensor, and based on the state of the own vehicle acquired by the vehicle-state sensor;

determine, when the collision is determined, whether to change a result of the collision determination, based on a change of a lap rate between the target object and the own vehicle, and based on a change of a lateral speed generated in the target object with respect to the own vehicle;

determine a turning direction of the own vehicle;

determine that the target object is a transverse pedestrian to be subjected to operation suppression, based on a pattern of generation of the lap rate generated in left and right sides of the own vehicle with respect to the turning direction of the own vehicle, and based on a pattern of generation of the lateral speed; and determine control intervention in the own vehicle, from the collision determination and the determination of whether to change the result of the collision determination.

9. The vehicle control device according to claim 8, wherein the controller is further configured to determine steering-decrease during turning of the own vehicle, and determine that the target object is a transverse pedestrian to be subjected to operation suppression, based on the pattern of generation of the lap rate generated in the left and right sides of the own vehicle with respect to the turning direction of the own vehicle, and based on the pattern of generation of the lateral speed.

10. The vehicle control device according to claim 8, wherein the controller is further configured to determine steering-decrease during turning of the own vehicle, and determine that the target object is a transverse pedestrian to be subjected to operation suppression, based on the pattern of generation of the lap rate which increases in the left side of the own vehicle and decreases in the right side of the own vehicle during steering-decrease in rightward turning of the own vehicle, or the pattern of generation of the lap rate which increases in the right side of the own vehicle and decreases in the left side of the own vehicle during steering-decrease in leftward turning of the own vehicle, and based on the pattern of generation of the lateral speed which increases during turning of the own vehicle.

11. The vehicle control device according to claim 8, wherein the controller is further configured to calculate the accuracy of the transverse pedestrian determination based on at least one of the lap rate and a change rate of the lap rate, and set a control threshold value adjustment gain for adjusting a control intervention threshold value serving as a reference for control intervention determination, based on the accuracy of the transverse pedestrian determination.

12. The vehicle control device according to claim 8, wherein the controller is further configured to calculate the accuracy of the transverse pedestrian determination such that the lower the lap rate or the smaller the change rate of the lap rate, the higher the accuracy, and set a control threshold value adjustment gain for adjusting a control intervention threshold value serving as a reference for control intervention determination, based on the accuracy of the transverse pedestrian determination.

13. The vehicle control device according to claim 8, wherein the controller is further configured to define the transverse pedestrian to be subjected to the operation suppression, from a speed vector of the pedestrian viewed from the own vehicle.

14. The vehicle control device according to claim 8, wherein the controller is further configured to define the transverse pedestrian to be subjected to the operation suppression, from orthogonality between the own vehicle and the pedestrian, which is determined from a speed vector of the pedestrian viewed from the own vehicle.

* * * * *